(12) United States Patent
Frankert

(10) Patent No.: US 12,141,886 B2
(45) Date of Patent: Nov. 12, 2024

(54) SYSTEM FOR ARRANGING TRANSPORTATION SERVICES AND ASSOCIATED METHODS

(71) Applicant: Justin Andrew Frankert, Exeter, NH (US)

(72) Inventor: Justin Andrew Frankert, Exeter, NH (US)

(73) Assignee: Justin Andrew Frankert, Pittsburgh, PA (US)

( * ) Notice: Subject to any disclaimer, the term of this patent is extended or adjusted under 35 U.S.C. 154(b) by 874 days.

(21) Appl. No.: 17/061,014

(22) Filed: Oct. 1, 2020

(65) Prior Publication Data
US 2021/0090199 A1 Mar. 25, 2021

Related U.S. Application Data

(63) Continuation of application No. 15/435,297, filed on Feb. 17, 2017, now Pat. No. 10,832,367.

(60) Provisional application No. 62/296,520, filed on Feb. 17, 2016.

(51) Int. Cl.
| | |
|---|---|
| *G06Q 50/40* | (2024.01) |
| *H04B 1/713* | (2011.01) |
| *H04L 65/1069* | (2022.01) |
| *H04W 76/15* | (2018.01) |
| *H04W 76/30* | (2018.01) |
| *G06Q 10/02* | (2012.01) |
| *H04L 9/40* | (2022.01) |
| *H04W 4/80* | (2018.01) |

(52) U.S. Cl.
CPC ............ *G06Q 50/40* (2024.01); *H04B 1/713* (2013.01); *H04L 65/1069* (2013.01); *H04W 76/15* (2018.02); *H04W 76/30* (2018.02); *G06Q 10/02* (2013.01); *H04L 63/062* (2013.01); *H04W 4/80* (2018.02)

(58) Field of Classification Search
CPC .......... G06F 15/16; G06F 17/00; H04M 1/60; H04M 1/66
USPC .................................. 455/411, 566; 715/734
See application file for complete search history.

(56) References Cited

U.S. PATENT DOCUMENTS

| | | | | |
|---|---|---|---|---|
| 10,817,969 | B2* | 10/2020 | Marco | G06Q 50/40 |
| 11,145,023 | B2* | 10/2021 | Khanna | G06Q 30/0629 |
| 2008/0114629 | A1* | 5/2008 | Pavlov | G06Q 50/40 |
| | | | | 705/347 |
| 2008/0195428 | A1* | 8/2008 | O'Sullivan | G06Q 10/025 |
| | | | | 705/6 |
| 2010/0190510 | A1* | 7/2010 | Maranhas | G06Q 30/0261 |
| | | | | 705/14.66 |
| 2010/0211401 | A1* | 8/2010 | Williams | G06Q 10/08 |
| | | | | 705/1.1 |

(Continued)

*Primary Examiner* — Olusegun Goyea

(57) ABSTRACT

A method of accessing media includes establishing a first network connection between a service provider device and a media device, wherein establishing the first network connection includes exchanging a set of network access parameters; establishing a second network connection between a user device and the service provider device; providing to a user device the set of network access parameters of the first network connection using the service provider device; and using the user device to control the media device, the user device using the set of network access parameters to mimic the first network connection with the media device.

20 Claims, 26 Drawing Sheets

(56) References Cited

U.S. PATENT DOCUMENTS

| | | | | |
|---|---|---|---|---|
| 2011/0059693 A1* | 3/2011 | O'Sullivan | ........ | G01C 21/3423 455/41.1 |
| 2011/0202393 A1* | 8/2011 | DeWakar | ........... | G06Q 20/3223 705/13 |
| 2012/0130891 A1* | 5/2012 | Bogaard | ................. | B60L 53/60 705/40 |
| 2015/0032485 A1* | 1/2015 | Nelson | ................... | G06Q 10/02 705/5 |
| 2015/0248689 A1* | 9/2015 | Paul | ................... | G06Q 30/0222 705/14.23 |
| 2019/0279510 A1* | 9/2019 | O'Sullivan | ........ | G01C 21/3423 |
| 2020/0098262 A1* | 3/2020 | O'Sullivan | ........ | G01C 21/3423 |
| 2020/0365023 A1* | 11/2020 | O'Sullivan | ............ | G06Q 10/00 |
| 2020/0410857 A1* | 12/2020 | O'Sullivan | ........... | G06Q 10/025 |
| 2021/0142669 A1* | 5/2021 | O'Sullivan | ............. | G06Q 10/02 |
| 2021/0209542 A1* | 7/2021 | Magazinik | ..... | G06Q 10/063118 |
| 2021/0335129 A1* | 10/2021 | O'Sullivan | ........ | G01C 21/3423 |

\* cited by examiner

SYSTEM FOR ARRANGING TRANSPORTATION SERVICES AND ASSOCIATED METHODS

CROSS-REFERENCE TO RELATED APPLICATION(S)

This application is a continuation of U.S. application Ser. No. 15/435,297, filed Feb. 17, 2017, which claims benefit of U.S. Provisional Application No. 62/296,520, filed Feb. 17, 2016, each of which is incorporated herein by reference in its entirety.

FIELD OF THE DISCLOSURE

This disclosure, in general, relates to systems for arranging transportation services and methods associated therewith.

BACKGROUND

With the growth of cities, many are choosing to move to an urban setting. But, such urban settings carry with them traffic congestion and additional expenses associated with owning a car. For example, in an urban setting, parking can be expensive, taxes on vehicle ownership can be excessive, and the logistics expenses associated with owning a vehicle can be large. As such, many residents and workers in urban settings are selecting alternative modes of transportation.

Many urban regions offer mass transportation. But, such mass transportation, while inexpensive, is accessed through fixed locations, which may not closely correspond with the destination of a user. The inconvenience is exacerbated during inclement weather. Moreover, such transportation options are often associated with overcrowding, crime, and a lack of cleanliness. Further, users do not have control of their environment, including music preferences.

As such, alternative forms of transportation and methods for accessing such transportation would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a system is established for arranging transportation services. In an example, a user can request a transportation service through a transportation server. The request can be for current transportation services or a reservation for transportation services in the future. The transportation server can determine a set of service providers (e.g., drivers) available to provide the requested transportation service, and can send a request to service providers available for providing the service. The transportation server can send the service provider request to the service providers simultaneously, concurrently, or sequentially. In an example, the service providers can accept the service provider request. The transportation server can provide to the user the option to select service from a set of service providers, and the user can select a service provider. Following selection of the service provider, the transportation server can notify both the selected service provider and the user. The transportation server can route the service provider to the user and provide details regarding the user's final destination. In particular, the system can facilitate the interactions and requests using a user device and service provider device, such as mobile phones and tablet devices. For example, smart phones and tablet devices connected through cellular networks or wide area wireless networks can be used by the system to facilitate the interactions. In an example, each of the interactions can be implemented using applications on mobile devices associated with the user or the service provider. Such mobile devices can include smart phones, tablet devices, laptops, similar network device, or any combination thereof. The transportation server can be one or more servers at one or more locations performing the same function or portions of the functions described below.

The system can further provide options to the user to customize the provided service to meet user preferences. For example, a user can indicate a desire to have a vehicle at a particular temperature or control other aspects of the drive-time environment. In a particular example, a user can desire control of media playback, such as music playback. In particular, a user can be offered the option to control media playback such as music, using the user's device, e.g., a smart phone or tablet. Alternatively, the user can provide a preference, such as a broadcast media, a playback list available through a music service, or a genre of music that can be used by a music service to generate streaming media. The service provider can implement the user preferences, either by facilitating the playback of music associated with the user preferences or by providing the user device access to the media playback device.

Figure 1:
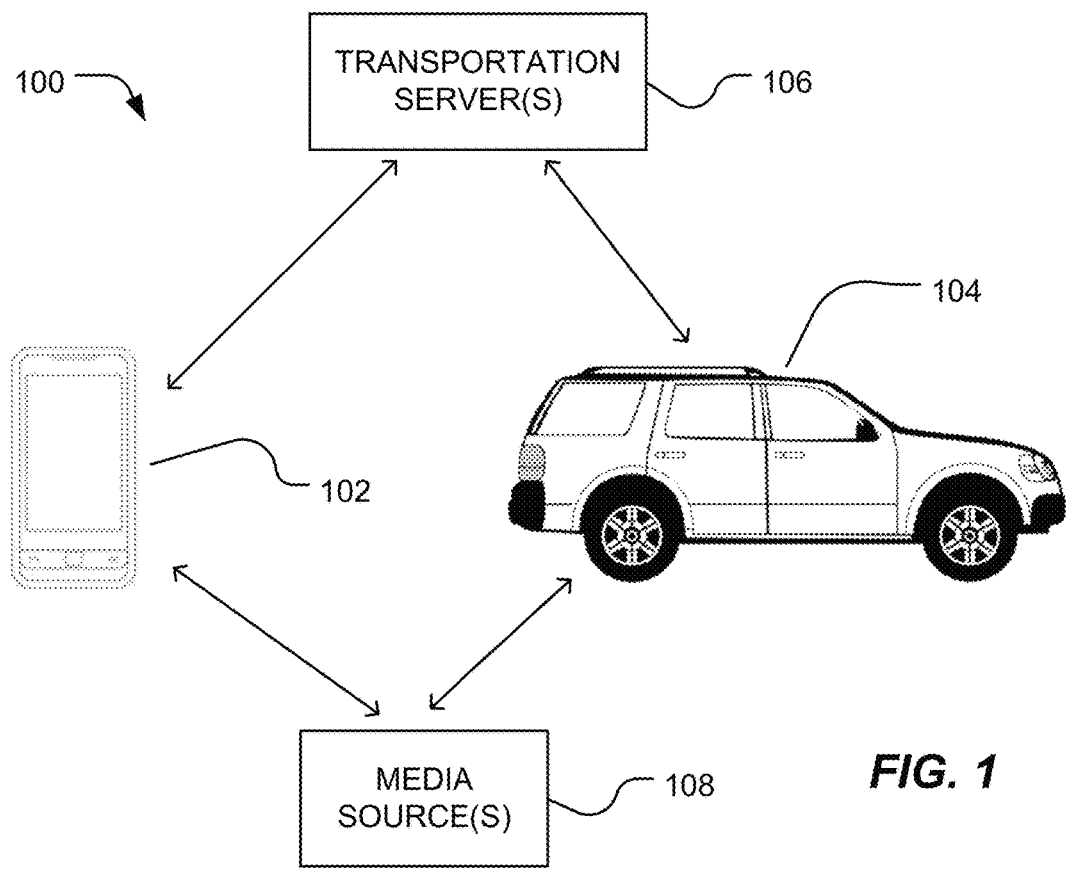
FIG. 1 includes an illustration of exemplary system for arranging transportation services.

In an exemplary embodiment, FIG. 1 includes an illustration of an exemplary system 100 for arranging transportation services. In particular, a user 102 through a user device can send a service request through a network to the transportation server 106. The user device can, for example, be a computational device capable of interacting through a network with the transportation server. Such devices can include smart phones, tablets, laptops, desktops, or any combination thereof connected through a wide area or global network to the transportation server 106. In a particular example, the user device can be a smart phone or tablet device in communication with the transportation server 106 through a cellular data network or a wide area wireless network. Exemplary cellular data networks include 3G, 4G, or LTE data networks. Wide area wireless networks can be established using protocols such as Wi-Fi (compatible with IEEE 802.11x), WiMAX (compatible with IEEE 802.16), or similar protocols. In a particular example, a user can interact through an application on a smart phone or tablet and can communicate with the transportation server 106. The transportation server 106 can be one or more servers at one or more locations performing the same function or portions of the functions described herein.

The transportation server 106 can also be in communication with a service provider 104. The service provider 104 can have a vehicle appropriate for providing services requested by the user. In particular, the service provider 104 can have a service provider device, such as a smart phone, tablet, or laptop, in communication with the transportation server 106 through a cellular data network or wide area wireless network. The transportation server 106 can interact with the service provider 104 to arrange for transportation services that can be offered to the user through the user device 102. Once the transportation server 106 has arranged services between the service provider 104 and the user 102, the transportation server 106 can monitor the transaction and provided service, and optionally provide feedback regarding the provided service. For example, the transportation server 106 can monitor the locations of the user and service provider, determine whether the service provider provided the service, establish an end of service, and ascertain deviations from the arranged transportation service. In a further example, the transportation server 106 can request feedback regarding the transportation service, for example, from the user regarding the service provider and optionally, from the service provider 104 regarding the user.

The system 100 can also offer options for controlling the environment of the vehicle in which the transportation service is provided. For example, the user device 102 can provide user preferences as to environmental controls to the transportation server 106, which can provide such user preferences to the service provider 104. In another example, a user device 102 can be used to establish user preferences, such as music preferences, that can be transmitted to the service provider 104 through the transportation server 106. Alternatively, the user device 102 can access other media sources, such as streaming media sources 108, available through cellular data networks or wide area wireless network. Using various methodologies, the user device 102 can interact with the devices of the service provider 104 to implement media content playback on media devices associated with the service provider 104 or the service provider's vehicle.

Figure 2:
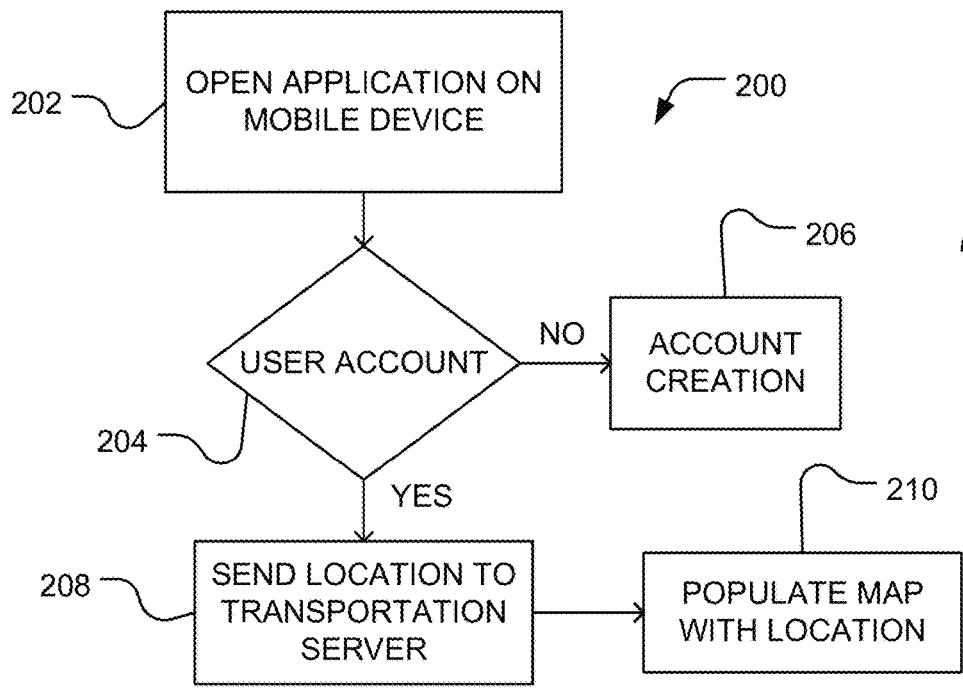
FIG. 2, FIG. 3, FIG. 4, FIG. 5, FIG. 6, FIG. 7, FIG. 8, FIG. 9, FIG. 10, and FIG. 11 include flow diagrams illustrating exemplary methods for arranging transportation.

As illustrated in FIG. 2, a method 200 for arranging transportation services includes opening an application on a user device, as illustrated at 202. The user device implementing the application can determine whether the user has an account, as illustrated at 204.

In the absence of a user account, the user device can direct the creation of an account, as illustrated at 206. For example, the user device can implement an interface, such as through an application that loads a template for receiving account information. For example, the user can be prompted for name, address, email address, social media contacts, images, passwords and other identification. Further, the user can be prompted for payment preferences, such as entering a credit card, gift card, bank account, PayPal®, Apply Pay, Google Wallet, and associated security information. In another example, the user can be prompted for preferences, such as music preferences, environmental preferences, and preferences associated with application functionality, such as notification preferences or calendar preferences. The user device can provide the account information to the transportation server, which can perform checks and balances, such as analyzing data integrity and checking payment information.

When the user account is established, the user device implementing the application can send a location to a transportation server, as illustrated at 208. For example, the user device can have access to a cellular data network or a wide area wireless network through which the location and service request is sent. The transportation server can optionally populate a map with the location of the user, as illustrated at 210, identify available service providers, and optionally provide the populated map including the location of service providers to the user device.

Following a request for service, the transportation server can interact with the user and the service provider (e.g., a driver) to arrange for transportation services. In particular, the transportation server can provide to the user a set of service providers from which to select. The set of service providers can be provided in an illustration depicting a map location of service providers relative to the user. In another example, the set of service providers can be presented as a list providing details about the service provider using ratings, vehicle type, and offered price.

Figure 3:
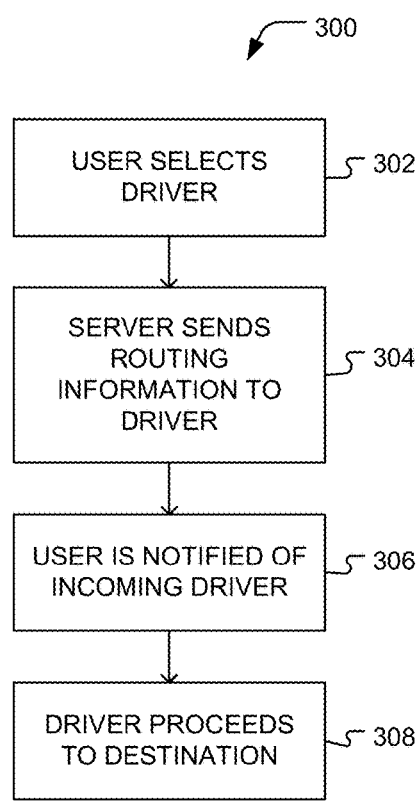

For example, as illustrated in FIG. 3, a method 300 includes a user selecting a service provider, such as a driver, as illustrated at 302. The user can select the driver by selecting the driver from a map depiction of the location of the driver relative to the user. In another example, the user can select the driver from a list of drivers. The list of drivers can include additional information such as driver ratings, number of miles driven, number of trips provided, vehicle type, price, or any combination thereof. Optionally, selecting a driver depicted on a map can also result of the display of the driver details.

As illustrated at 304, the transportation server can send routing information to the driver. The routing information can include an initial location, destination, and optionally, suggested routes to implement the service. In addition, information about the user can be provided to the driver. If the user has a picture within the user's profile stored on the transportation server or on the user device, the picture can be transferred to the selected driver. In another example, the information can include features associated with the user's device, such as a beacon address, network parameters, or device capabilities.

As illustrated at 306, the user can be notified of the incoming driver by the transportation server. For example, the transportation server can send to the user device details regarding the driver's vehicle, profile pictures of the driver or drivers vehicle, license plate information, media playback options, environmental control options, current location, or time to arrival, or any combination thereof.

Once the driver arrives and acquires a user, the driver can proceed to the final destination, as illustrated at 308. In a particular example, the transportation server can monitor the service being provided by monitoring locations of the user and driver devices, which environmental control options are used, such as media content playback, satisfaction with the service provided or with the user, or monetary transactions between the user and driver, such as gratuities and tips, an end of the service, or any combination thereof.

Figure 4:
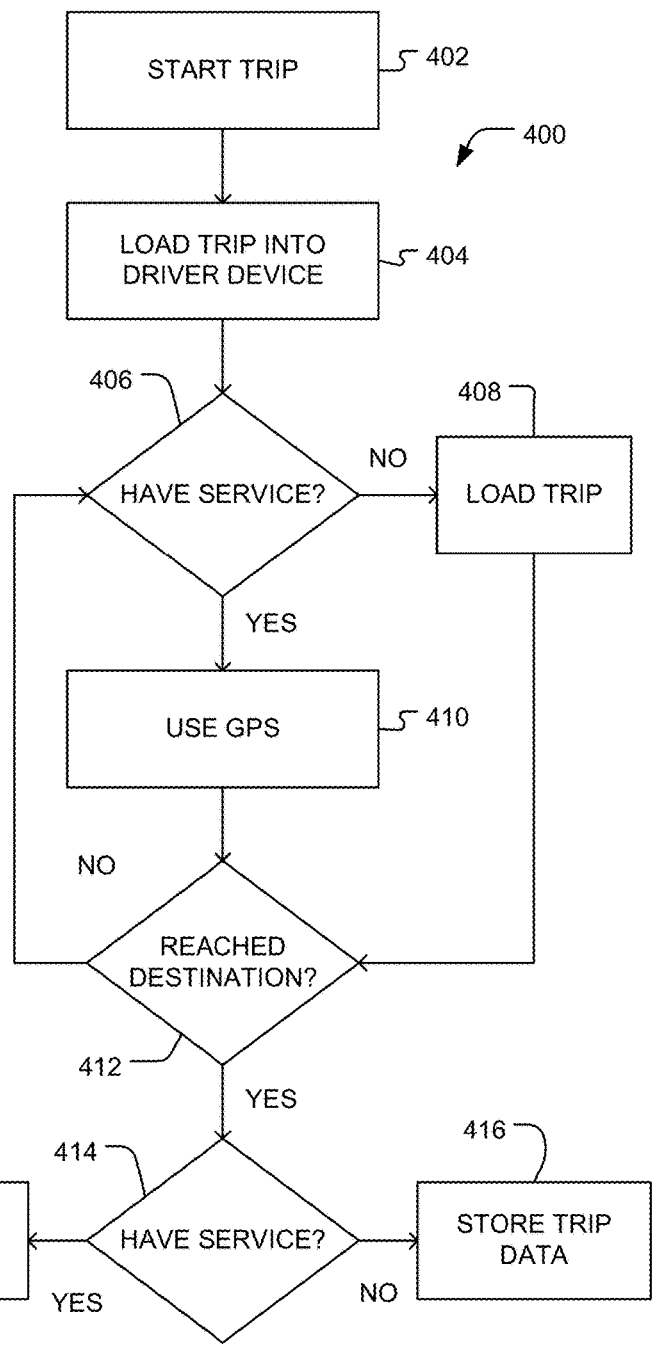

FIG. 4 illustrates a method 400 for managing service information at the service provider device. For example, as illustrated at 402, a service can start. The service provider is directed to a user location and picks up the user. Information about the service, such as initial location, destination, other routing information, or any combination thereof, can be loaded into the service provider device, as illustrated at 404.

Throughout the service, the service provider device can provide updates to the transportation server while the service provider device has access to the cellular data or wide area wireless networks. In particular, the service provider device can inquire whether it has network service, such as through cellular data network or wide area wireless network, as illustrated at 406. When the service provider device does not have network access, the service provider device can access the pre-loaded routing information and optionally display the route to the desired destination. In such a case, updates are not provided to the transportation server and in the event that GPS is unavailable, the driver can rely on general mapping directions to reach the final destination.

When the service provider device has service, the system can access GPS data and monitor progress, as illustrated at 410. The service provider device can monitor whether the service provider has reached a final destination, and optionally provide updates on location to the transportation server. For example, the system can determine whether the service provider has reached the destination, as illustrated at 412.

When the service provider has reached the destination, the system can check to see whether it has network service, as illustrated at 414. When service is unavailable, the service provider device can store information about the transaction, as illustrated at 416. Such information can be uploaded when service is reestablished.

When the service provider device has network access, the service provider device can enable checkout, as illustrated at 418. In an example, checkout includes notifying a transportation server that the service is complete, allowing financial transactions to complete, optionally providing a tip or gratuity. The transportation server can also interact with a user device to further facilitate checkout, such as giving the user device commands to implement the checkout system on the user device. The user device can also be prompted to provide a rating associated with the driver. In another example, the service provider device can be prompted to provide a rating associated with the user.

In a particular example, the system can offer to a potential customer upfront pricing associated with a service request. The system can also provide a user with multiple options from which to select a service by price, vehicle, or driver, or any combination thereof. The transportation server can receive from the user a service request including details about the service, such as the user's location and a desired destination. A transportation server can determine a price based on the locations, destinations, distances, time of day, traffic patterns, driver availability, other influencers, or any combination thereof.

For example, when a user opens the application, a user's GPS location and position are sent to the transportation server. The user through the application can interact with a map or provide a street location for a destination. Optionally, the transportation server can populate a map with the location of service providers that are available. Once service is requested, details about the service are provided to drivers that have the option to accept or pass on a service request or offer a different price. The accepting drivers and associated prices can be reflected back to the user through the user device. The user can select using the user device a transportation service, and service can be scheduled. The user and driver can be directed to a location to meet.

Figure 5:
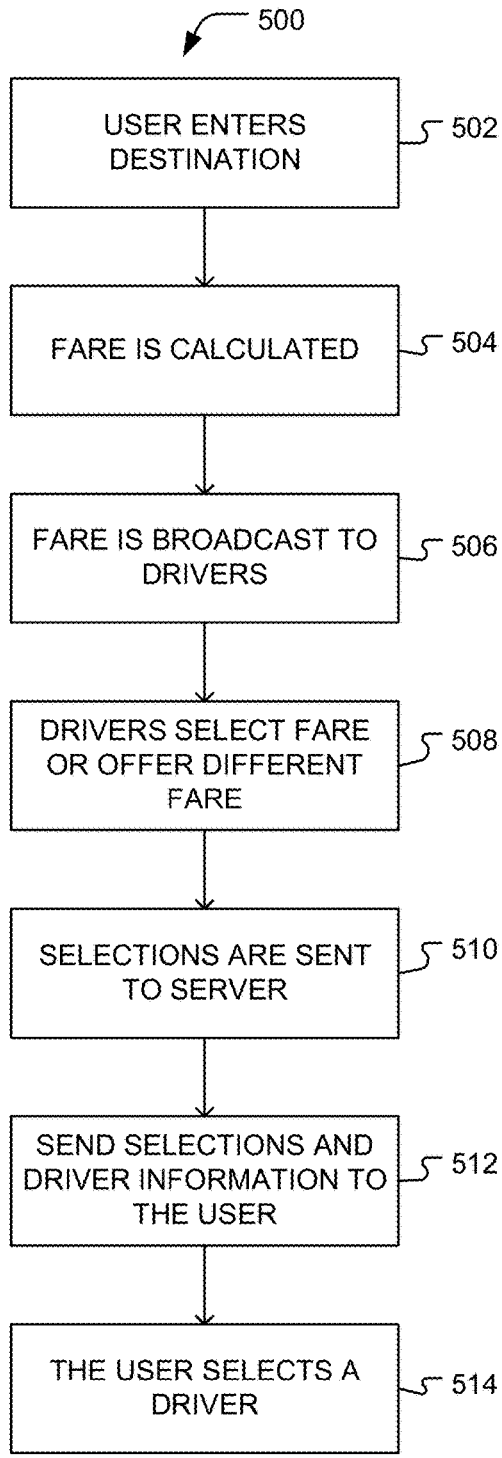

For example, as illustrated in FIG. 5, a method 500 for arranging transportation service includes a user entering a destination, as illustrated at 502. A transportation server can have the user's current location and destination, and the request can include information about the timing of the requested service, such as immediate, within a prescribed time frame, or at a later date. The request can also include additional information, such as requested vehicle type, number of occupants, environmental conditions associated with the vehicle, or music preferences.

As illustrated at 504, a proposed fare is calculated. In particular, the transportation server can take into account location, destination, time of day, traffic conditions, special events, supply, demand, occupancy, vehicle type, other factors that influence the fare, or any combination thereof.

The transportation server can broadcast to service provider devices the proposed fare, as illustrated at 506. In particular, details about the service request, such as user location, user destination, user rating, requested environmental or music preferences, or other details about the requested service, can also be provided to the service provider. In addition, the service provider can be provided with the option to offer a different fare or select the proposed fare. For example, an interface on the service provider device can display a plurality of discounted fares along with the proposed fare, or alternatively or additionally, premium fares from which the service provider can select. Alternatively, the service provider device can display the proposed fare and control elements permitting adjustment of the proposed fare. In a particular example, the service provider is provided a limited time in which to select or offer a fare.

As illustrated at 508, the service provider selects a fare, passes on service request, or offers a different fare. The offered fare is provided to the transportation server, as illustrated at 510. The transportation server can send the offered fares and driver information to the user device, as illustrated at 512. For example, the transportation server can provide to the user device a listing of service providers and fares from which the user can select. The listing can include additional details about the service provider, such as rating, vehicle type, environmental and music options, number of miles driven, number of trips provided, or any combination thereof. Alternatively, the driver information can be displayed in a map format showing service provider location and associated offered fare.

The user can select a service provider, as illustrated at 514, from the set of service providers provided by the transportation server. In particular, the user device can display the set for a period of time within which the user can select a service provider, for example, based on the offered fare or other driver information. When the user fails to select a service provider from the set of service providers within a set duration, the user device can prompt the user to resend the request and reinitiate the process of generating a set of offered fares.

Figure 6:
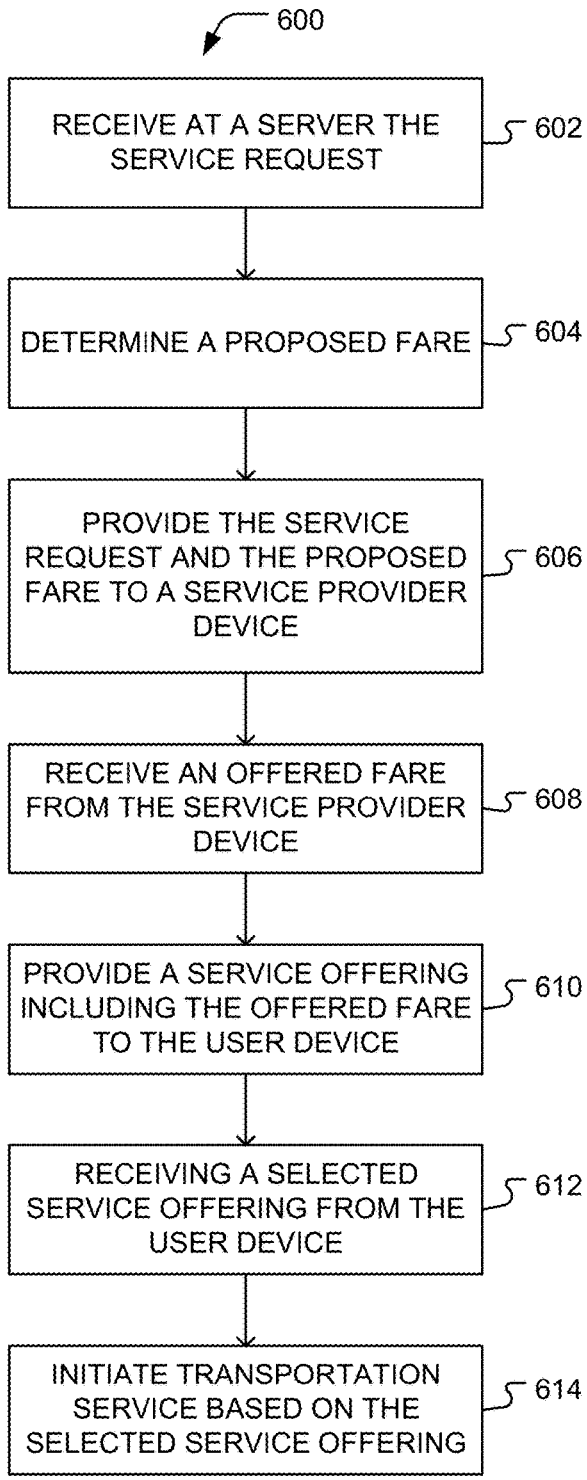

FIG. 6 illustrates an exemplary method 600 for initiating a transportation service based on proposed fares from the perspective of a transportation server. As illustrated at 602, the transportation server can receive a service request. The service request can include an initial location, a destination, a number of occupants, a scheduling time and other preferences associated with the service requested.

The transportation server can determine a proposed fare, as illustrated at 604. The proposed fare can be influenced by aspects such as initial location and final destination, as well as other factors such as time of day, traffic, routing, number of occupants, vehicle types, or user preferences.

As illustrated at 606, the transportation server provides the service request and the proposed fare to the service provider devices. In particular, the transportation server can broadcast to a plurality of service provider devices a service request and the proposed fare.

The service provider device can display the proposed fare and service request along with the option to offer a different fare. The option can be provided through controls or selecting from the proposed fare or a set of other optional fares. Alternatively, the control be provided for adjusting the proposed fare. As illustrated at 608, transportation server can receive an offered fare from the service provider device. For example, the offered fare can be the same as the proposed fare. In an alternative example, the offered fare is different from the proposed fare. The transportation server can aggregate a list of service providers that are offering to provide service at the various offered fares.

As illustrated at 610, the transportation server can provide the service offerings including the offered fares to the user device. The user device can display the list of offered fares and associated details about the service providers. For example, the list can be displayed for period of time or duration during which the user can select offered fare. Alternatively, the list can be provided to overlay a map additionally showing the location of each service provider.

As illustrated at 612, the transportation server can receive the selected service offering from the user device. The selected service offering incorporates the offered fare, which establishes the fare for the service to be provided. The transportation server can initiate transportation service based on the selected service offering, as illustrated at 614. For example, the transportation server can send details about the transportation service to the user device and to the service provider device.

Figure 7:
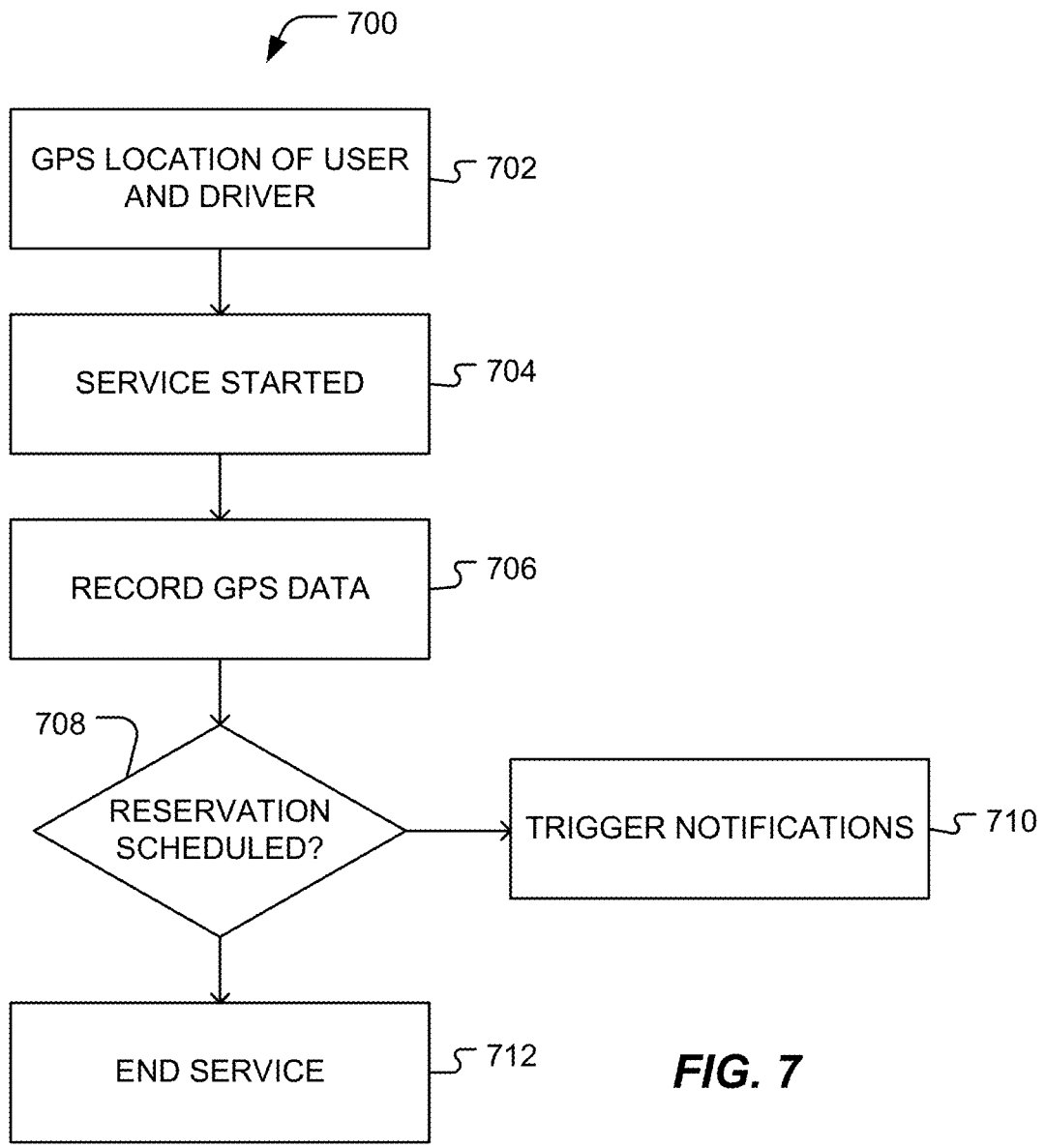

Throughout the provided service, the system can monitor the locations of the user and service provider to determine how the service is progressing. For example, as illustrated in FIG. 7, a method 700 includes monitoring the GPS location of the user device and a service provider device, as illustrated at 702. The user device and the service provider device can upload GPS location periodically to the transportation server. In particular, the transportation server can direct more frequent uploading of GPS location when the service provider is providing transportation services to the user to monitor progress of the transportation service.

As such, the transportation server can identify when service started, as illustrated at 704. For example, when the user device and service provider device are in close proximity, the transportation server can ascertain whether the service started. In a further example, the transportation server can determine that transportation service started when the user device and service provider device are on the move together to a second location.

Throughout the service, the transportation server can record the GPS data, as illustrated at 706. When the service provider has a later scheduled reservation, the system can determine whether the current service being provided conflicts with the planned future reservations, as illustrated at 708.

For example, when the current service conflicts with the future reservations, notifications can be triggered by the transportation server, as illustrated at 710. In an example, the transportation server can find an alternative service provider to service the reservation. In another example, the transportation server can notify the user device associate with the reservation of the potential conflict and can initiate selection of a new service provider.

When there are no reservations scheduled, the transportation server can continue to monitor GPS location until the service ends, as illustrated at 712. For example, the transportation server can determine the end of services through communication with a service provider device or the user device, e.g., when the service provider or user use an application to notify the transportation server of service. In another example, the transportation server can determine the service has ended when the service provider device and the user device reach the designated destination. In a further example, an end of service can be determined when the user device and service provider device are no longer the same location.

Figure 8:
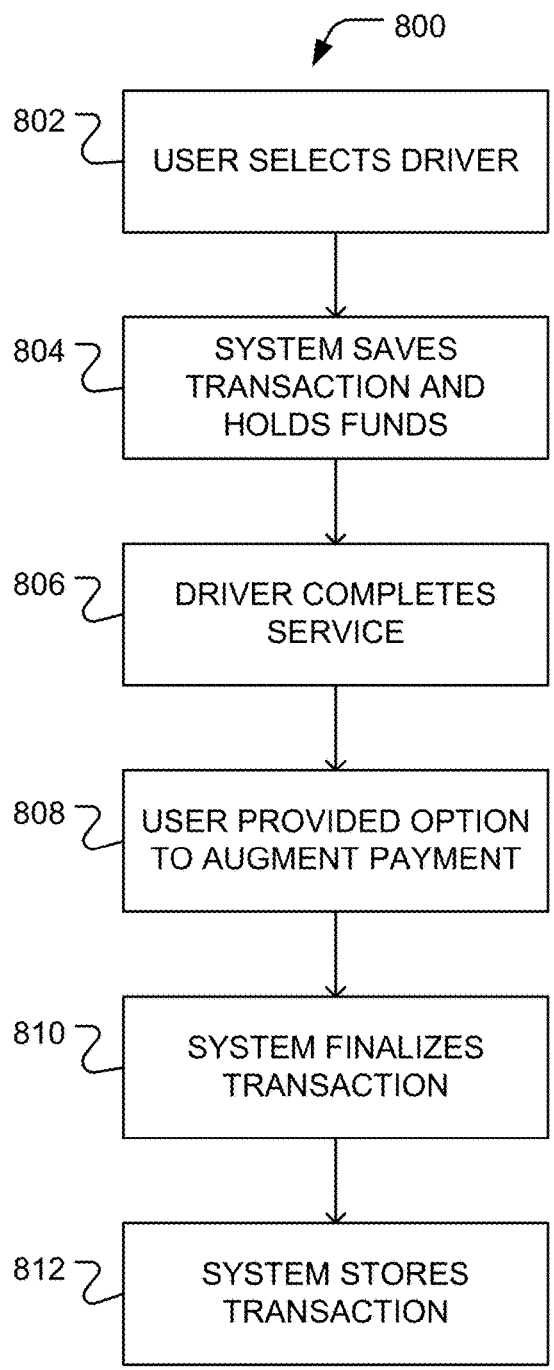

In a particular example, the user device and service provider device interact through the transportation server to close a transaction once the service is completed. The transportation server can finalize the transaction and facilitate exchange of funds. For example, as illustrated in FIG. 8, a method 800 includes a user selecting a service provider, as illustrated at 802. In particular, the user selects a service provider on the user device when provided the option to select from one or more service providers. When selecting a service provider, the user also accepts an offered fare.

As illustrated at 804, the system saves the transaction and holds the funds derived from the user's payment option. In an example, the transportation server can store a user profile that includes payment preferences, such as bank account information, credit card information, gift card information, pre-paid credits, PayPal® information, Apply Pay information, Google Wallet information, or any combination thereof.

As illustrated at 806, the service provider can complete the service, for example, transporting the user to the user's desired destination. In an example, the transportation server can be notified by the service provider device that service is complete. In another example, the transportation server can be notified by the user device that transportation service is complete. In a further example, the transportation server can detect completion of the service by monitoring the locations of the service provider device and the user device.

As illustrated at 808, the user can be provided the option to augment payment. For example, the user can be offered the option to add a tip or gratuity to the agreed-upon fare. In an example, the transportation server can facilitate the addition of the tip or gratuity through the user device. In another example, the transportation server can facilitate the augmentation of the fare through the service provider device.

The system can finalize the transaction, as illustrated at 810. For example, the system can ensure that the funds are transferred as directed based on the agreed-upon fare and any augmentation offered by the user. As illustrated at 812, the system can store the transaction and maintain records.

In particular, the system can offer selected service requests to a service provider based on the benefit of the service request to the service provider. For example, the system can recommend a service request to a service provider based on the monetary goals of the service provider, shift preferences, convenience, or any combination thereof.

Figure 9:
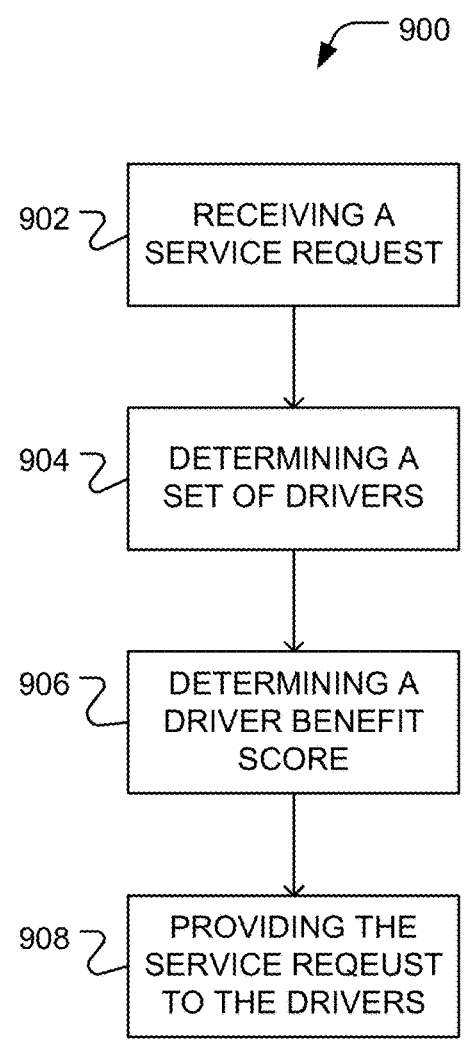

In an example illustrated in FIG. 9, a method 900 includes receiving a service request, as illustrated at 902. The service request can include an initial location, a destination, an indication of start time, or user preferences.

A set of service providers is selected by the transportation server, as illustrated at 904. The set of service providers can be selected based on proximity to the initial location, availability, preferred shift times, user favorites, other factors, or any combination thereof. For example, when the service request is for a current service, the set of service providers can be selected based on current availability, proximity to the user, a user favorite, or any combination thereof. In another example, when the service request is for a later reservation, the set of service providers can be selected based on preferred work times, user favorites, other factors, or any combination thereof.

For each of the service providers of the set of service providers, the system can determine a benefits score, as illustrated at 906. The benefits score can, for example, take into account desired locations associated with the driver, such as end of shift locations, monetary criteria associated with a service provider or with a group to which the service provider belongs, existing reservations, other factors, or any combination thereof.

The system can provide the service request to the set of service providers, as illustrated at 908, with a recommendation or lack of recommendation based on whether a benefit score meets a criteria or a threshold. For example, when the service request is associated with a destination in proximity to a service provider's home near the end of a preferred work time, the benefit score can be high, leading to a recommendation. In another example, when the service request influences the earnings of a service provider or group of service providers to approach a level associated with a reward, the service request can be recommended. In another example, when a service request has an associated time and destination compatible with a service provider's later reservation, the service request can be recommended.

In an example, the system can selectively present to service providers transportation requests that are beneficial to the service provider or assist the service provider in earning additional income. In particular, the system can access a service provider's profile and determine preferred workhours, home locations or preferred locations, preferred neighborhoods, areas, or regions, or any combination thereof.

Figure 10:
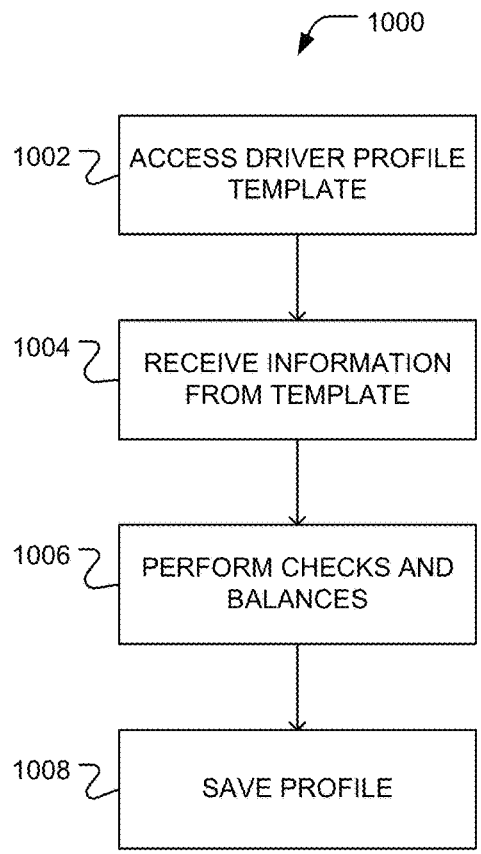

For example, as illustrated in FIG. 10, a method 1000 includes accessing a service provider profile template through the service provider device, as illustrated at 1002. Alternatively, the service provider's profile template can be accessed through other network devices, such as laptop or desktop computers.

As illustrated at 1004, the transportation server can receive information from the template. The information can include details about a service provider's preference, such as a location, preferred neighborhoods, preferred workhours, income objectives, preferred regions of work, or any combination thereof.

As illustrated at 1006, the transportation server can perform checks and balances. In particular, the transportation server can perform heuristic checks on the data to ensure that is consistent or error-free. In the event that a new service provider is entering a profile, the checks and balances can include criminal background checks, traffic record checks, vehicle record checks, other checks and balances, or any combination thereof. As illustrated at 1008, the transportation server can save the profile for access later when determining whether to offer a service request to driver.

Figure 11:
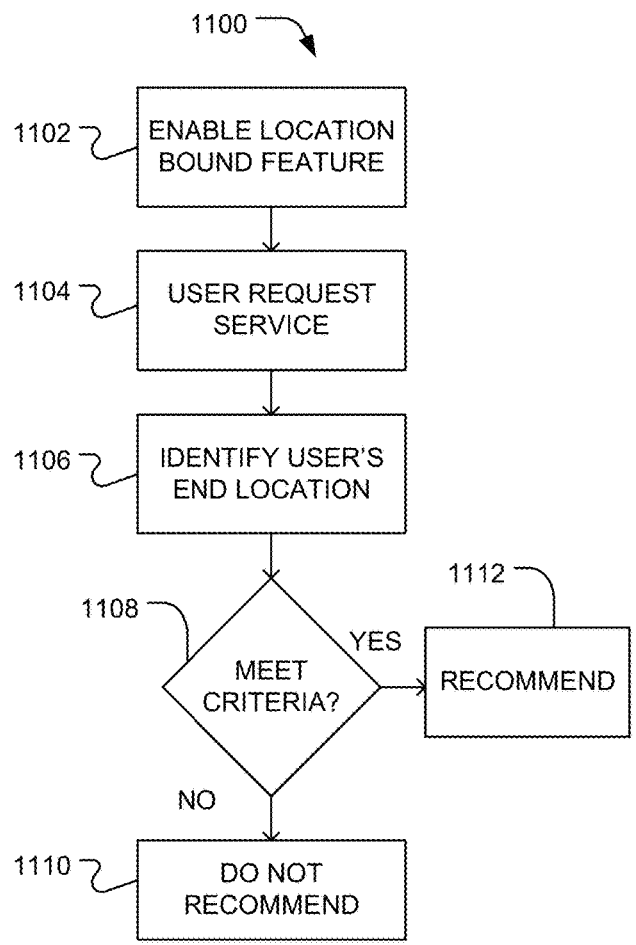

In a particular example, a service provider can indicate the desired end at a destination. For example, the service provider can indicate a desire to end a shift in close proximity to the service provider's home. In another example, the service provider can indicate a desire to end a shift in a location proximal to a second job, event, or other preferred location. For example, as illustrated in FIG. 11, a method 1100 includes enabling a location bound feature on the service provider device, as illustrated at 1102. For example, the service provider can enable through the service provider device a homebound feature. The transportation server can have a stored location associated with the service provider.

The transportation server can receive a user request for service, as illustrated at 1104. In particular, the request for service includes an indication of the user's current location and a final destination. The transportation server can identify the user's desired destination, as illustrated at 1106.

As illustrated at 1108, the transportation server can determine whether the end location meets a desired criterion, such as when the end location is proximal to a location identified by the service provider as a desired location, such as a home location. Exemplary criteria include being proximal or within a radius of the service provider's desired location. In another example, the criteria can include a destination that is closer than the service provider's current location to the service provider's desired location.

When the criteria are met, the transportation server can provide a recommendation to the service provider device, as illustrated at 1112. Alternatively, when the criteria are not met, the transportation server can provide the service request with an indication that the service request is not recommended for the driver, as illustrated at 1110. In a further example, when the criteria are not met, the service request may not be sent to the service provider.

Figure 12:
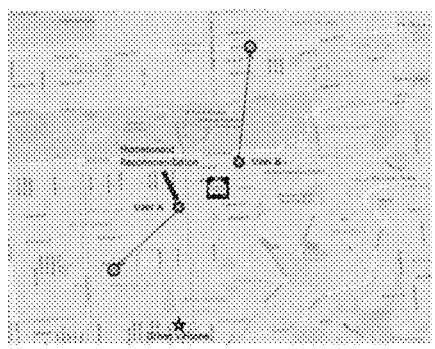
FIG. 12 includes an illustration of an exemplary scenario.

In a particular embodiment illustrated in FIG. 12, the service provider can indicate a desired location, such as the service provider's home. The service provider can be offered fares (User A instead of User B) that have initial locations within a bounded range proximal to the service provider's current location when a final destination of the fare is closer to the service provider's home location than service provider's current location.

Figures 13, 14:
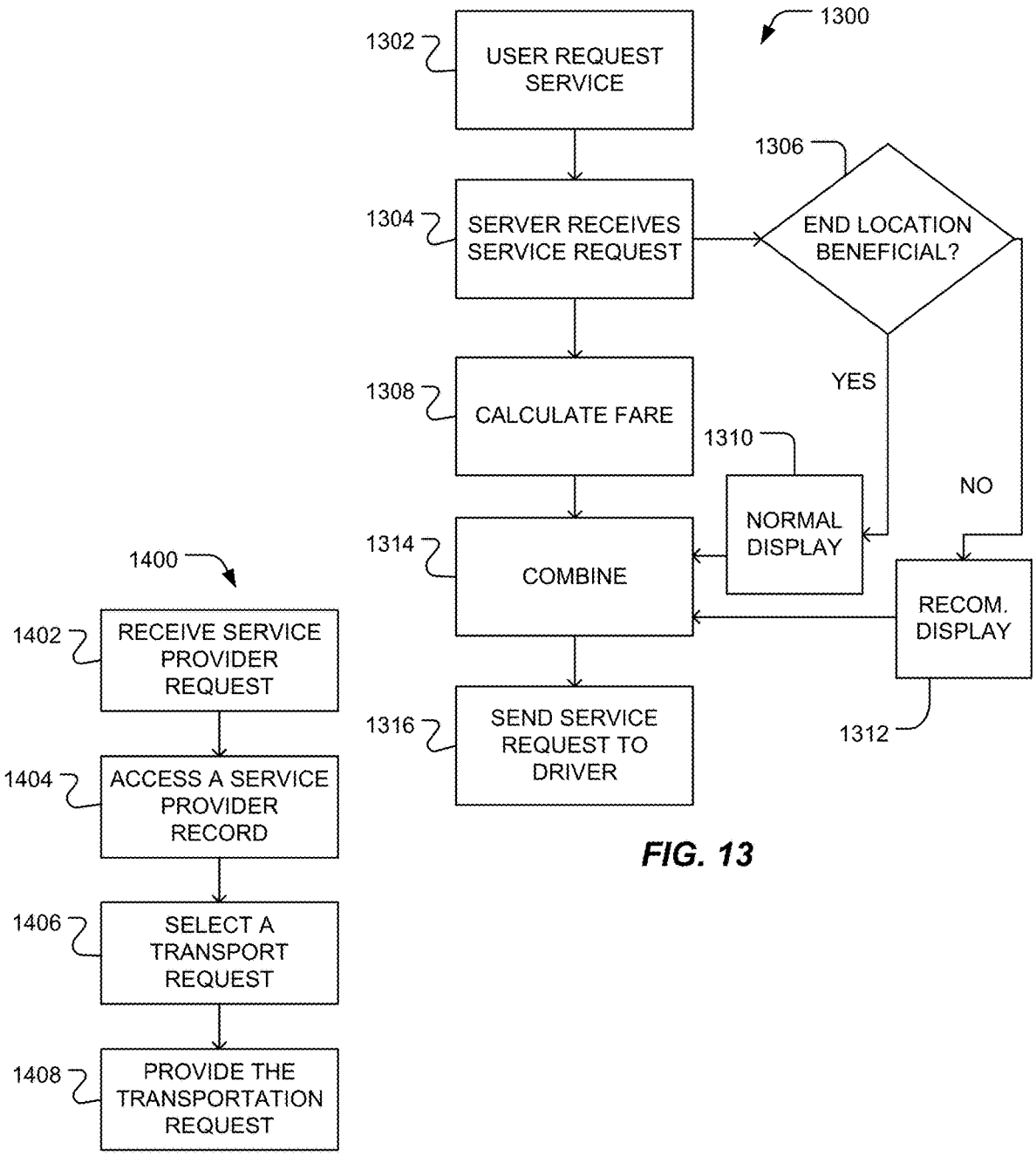
FIG. 13, FIG. 14, FIG. 15, FIG. 16, FIG. 17, FIG. 18, FIG. 19, FIG. 20, and FIG. 21 include flow diagrams illustrating exemplary methods for arranging transportation services.

In further example, illustrated in FIG. 13, a method 1300 includes receiving a request for service from a user, as illustrated at 1302. In particular, the user can enter a request for service on the user's device.

As illustrated at 1304, a server can receive the service request from the user's device, for example, through a cellular data network or wide area wireless network. The server can calculate an estimated or proposed fare, as illustrated at 1308.

In addition, the server can determine when the end location or destination of the service request is beneficial to particular service providers, as illustrated at 1306. When the destination is beneficial, as illustrated at 1312, the server can direct that a recommendation is displayed. Alternatively, when the destination is not beneficial, as illustrated at 1310, the server can direct that a normal display is to be used.

As illustrated at 1314, the proposed fare, details about the service request, and the display style (i.e., normal or recommended) can be combined into instructions that are sent to the service provider, as illustrated at 1316. The service provider can accept or pass on a given fare. In a particular example, service providers can accept the fare or offer a fare different than the proposed fare, as described above.

In a particular example, the transportation server can receive requests, check criteria from the service provider's preferences, and utilize such requests and criteria to select transportation requests to provide to the service provider. For example, as illustrated in FIG. 14, a method 1400 includes receiving a service provider request, as illustrated at 1402. Such a service provider request can be a request to end work time near a particular location or a request to work toward a particular location, area, or neighborhood.

As illustrated at 1404, the transportation server can access the service provider record to determine boundaries, thresholds, or locations associated with the service provider.

As illustrated at 1406, the transportation server can select a service request that meets the bounds and criteria associated with the service provider request or included in the service provider's record. The transportation server can provide the transportation request to the service provider device, as illustrated at 1408.

Figure 15:
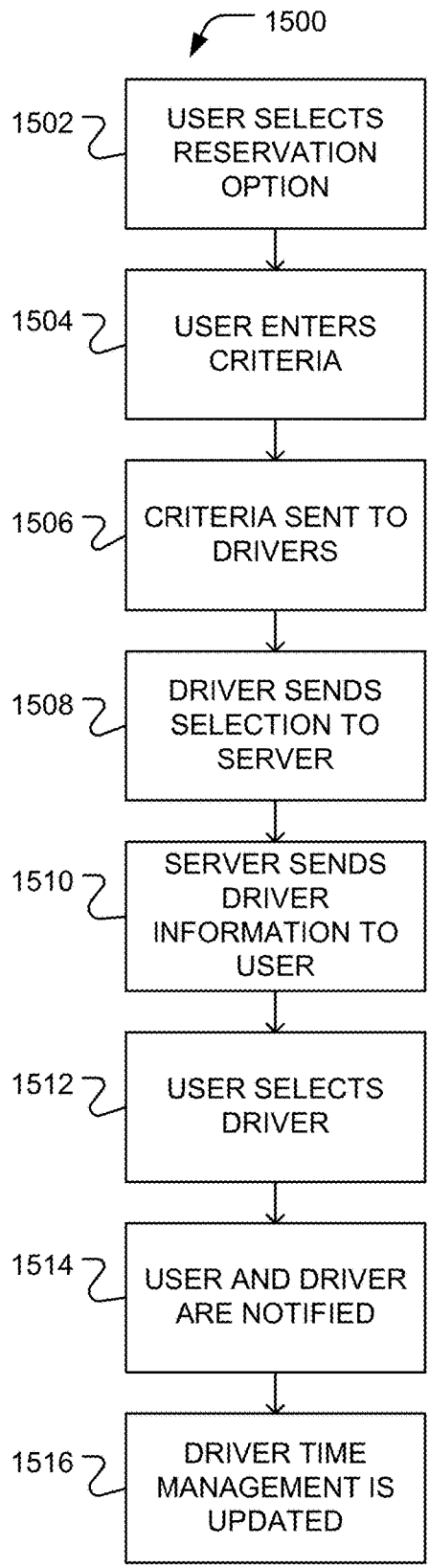

In a particular example, the system can facilitate reservations for future transportation services. For example, the system can receive and monitor reservations, provide service providers with the option to take additional fares that do not conflict with a reservation, provide a set of linked reservations having one reservations start proximal to where another one ends, or ensure, when a service provider is unable to meet the obligations for a reservation that an alternative servicer provider is commissioned. For example, as illustrated at FIG. 15, a method 1500 includes a user selecting a reservation option, as illustrated at 1502. The user can select a reservation option on the user device or through another computational device, such as a laptop or computer. For example, the user can access the reservation option through an application on a user device or can access a website using another network device.

As illustrated at 1504, the user enters criteria associated with the reservation. For example, the criteria can include an initial location, destination, an initial time, a type of vehicle, a number of occupants, or other criteria associated with the requested service. The transportation server can use the criteria to select service providers, and the reservation request can be sent to the selected service providers, as illustrated at 1506.

As illustrated at 1508, a service provider can send a selection to the server. For example, the service provider can select to accept the reservation. Alternatively, the service provider can decline the reservation.

As illustrated at 1510, the transportation server can send service provider information to the user through the user device or through the website accessed from an alternative device. The service provider information can include information about the service provider's vehicle, ratings, miles driven, trips provided, other details regarding the service provider, or any combination thereof. The user, either through an application on the user device or through the website displayed on an alternative device, can select a service provider, as illustrated at 1512.

Once the user selects the service provider, the user and service provider are notified, as illustrated at 1514. For example, user information is provided to the service provider, and service provider information is provided to the user. Optionally, the user and driver can be provided with calendar entries to be entered into respective preferred calendar programs. In a particular example, a user profile or a service provider profile can include information regarding a type of calendar program and a preferred method or parameters for entering events into the preferred calendar program.

As illustrated at 1516, the transportation server can update the time management system associated with a service provider. The transportation server can monitor the service provider's other activities to facilitate completion of the reservation.

Figure 16:
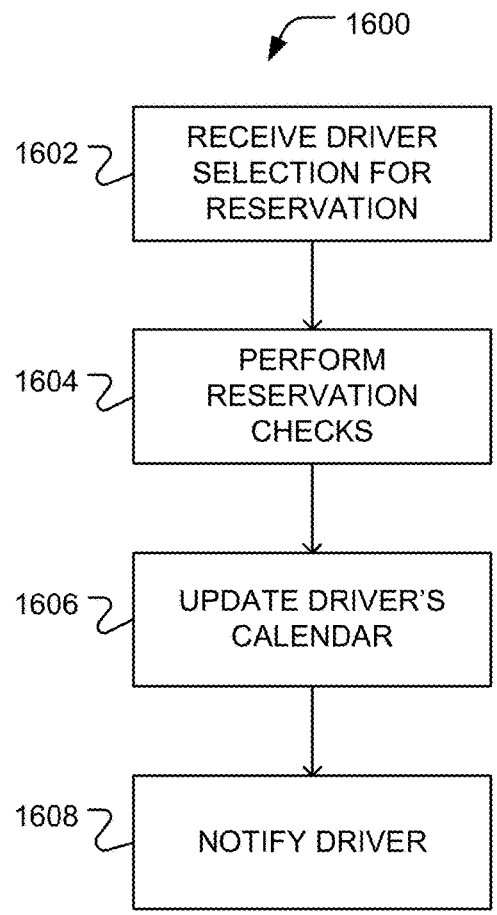

In another example method 1600 illustrated in FIG. 16, the server can receive a driver selection for reservation, as illustrated at 1602. The reservation can, for example, include an initial location, a final destination, as well as the time for initiating the transport service.

As illustrated at 1604, the transportation server can perform reservation checks. For example, the transportation server can check for conflicts with other reservations, conflicts with desired service feature, errors associated with selected service provider, conflicts associated with boundaries and regions indicated in the service provider's profile, or any combination thereof.

As illustrated at 1606, the service provider's calendar can be updated. For example, the service provider's profile can include a preferred calendar program, as well as parameters for facilitating entry of an event into the service provider's calendar program. As illustrated at 1608, the service provider can be notified of the reservation including, information about the user.

Figures 17, 19:
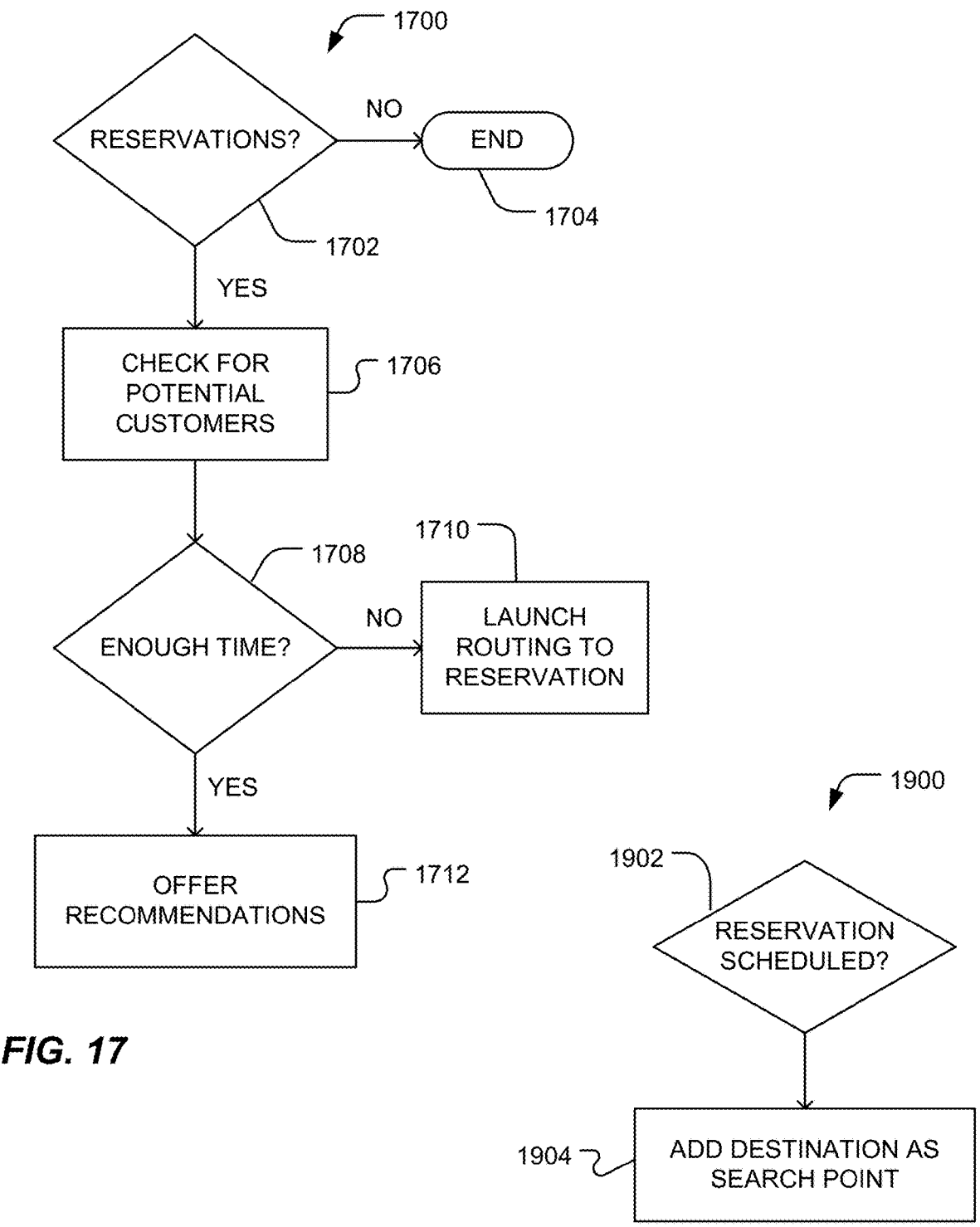

When a reservation is established, the system can monitor and provide additional service requests to the service provider, for example, under the condition that the additional service request do not conflict with the reservations. For example, as illustrated in FIG. 17, a method 1700 includes determining whether a service provider has future reservations, as illustrated at 1702. When the service provider does not have future reservations, the system can end the reservation monitoring and provide service requests using other protocols, as illustrated at 1704.

When there are additional reservations, the system can check for potential customers, as illustrated at 1706. For example, the system can receive service requests from users and compare the service request against service provider profiles and availability. The system can determine for service providers that have future reservations whether there is enough time until the next reservation to complete the service request, as illustrated at 1708.

When there is enough time, the system can recommend a service request to the service provider, as illustrated at 1712. Alternatively, when there is not enough time to the reservation, the system can route the service provider to the reservation, as illustrated at 1710. For example, the system can determine whether there is enough time based on an estimated time to completion of the proposed service request, as well as a time to travel from a destination of the service request to the initial location of the reservation. When there is not enough time to complete the proposed service request and travel to the initial location of the reservation before the initial time of reservation, the transportation server can restrict offering fares to the service provider.

Figure 18:
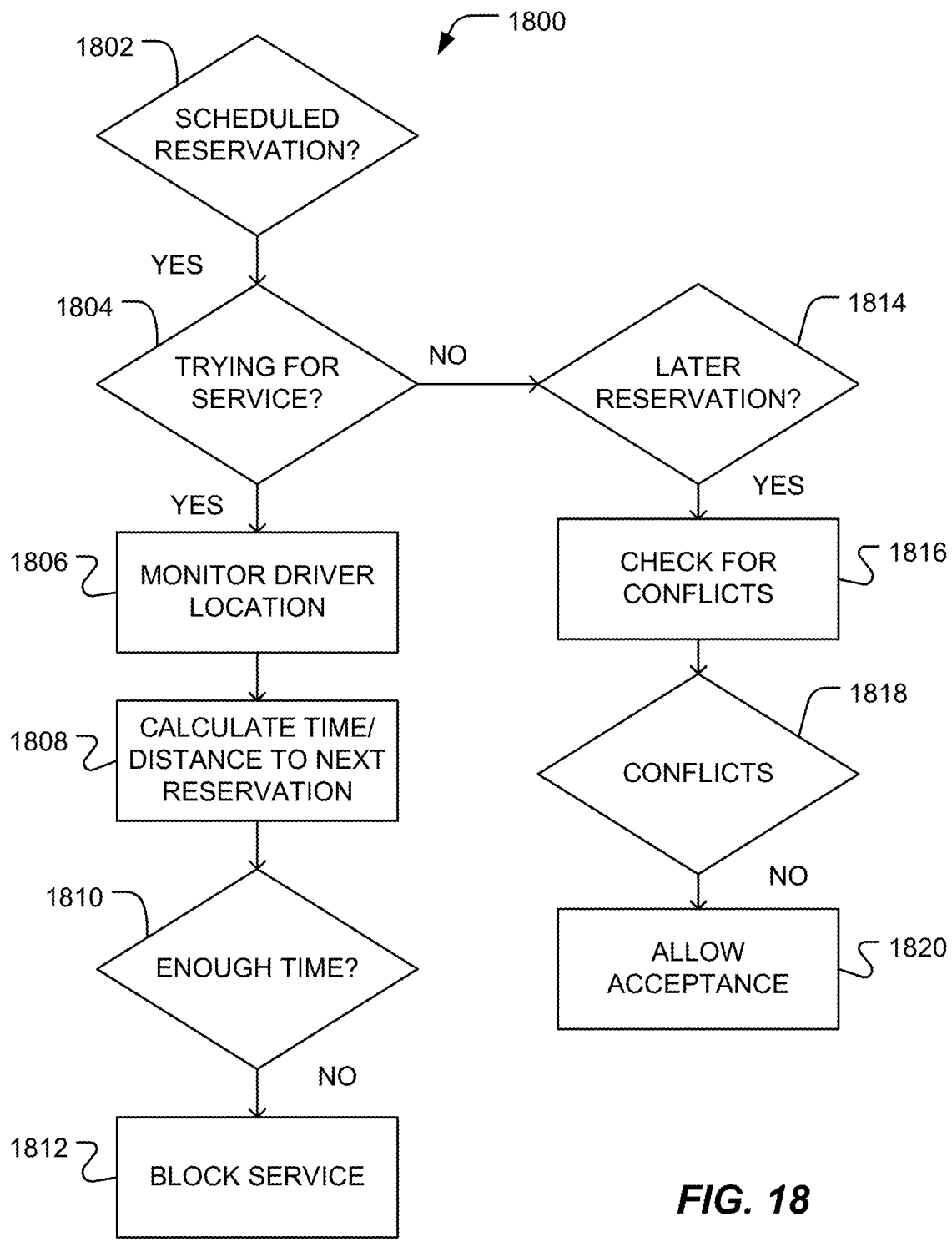

In a further example illustrated in FIG. 18, a method 1800 includes determining whether the service provider is associated with a scheduled reservation, as illustrated at 1802. When a reservation is scheduled, the system can determine whether the service provider is trying for service, as illustrated at 1804.

When the service provider is not trying for service, the system can seek a later reservation, as illustrated at 1814. The system can check for conflicts with the scheduled reservation and the later reservation, as illustrated at 1816. In the absence of conflicts, as illustrated at 1818, the system can allow for acceptance of the later reservation, as illustrated at 1820.

When the service provider is trying for service, the system can monitor the location of service provider, as illustrated at 1806. The system can calculate a time/distance to the next reservation, as illustrated at 1808. Such time and distance can incorporate the time and distance to complete a service request in addition to traveling to the initial location of the reservation at the initial time of the reservation. When there is not enough time to complete an additional service request, the system can block service, as illustrated at 1812. As such, the service provider is prevented from taking on additional fares prior to a reservation when such fares would prevent accommodation of the reservation.

In another example, the system can arrange for additional service to follow expected reservations. For example, as illustrated in FIG. 19, a system 1900 includes determining whether a service provider has an upcoming reservation, as illustrated at 1902. When the driver has a scheduled reservation, the system can add the destination of the scheduled reservation as a search point, as illustrated at 1904. As such, the system can identify additional service requests or reservations to be added to the schedule of the service provider.

Figure 20:
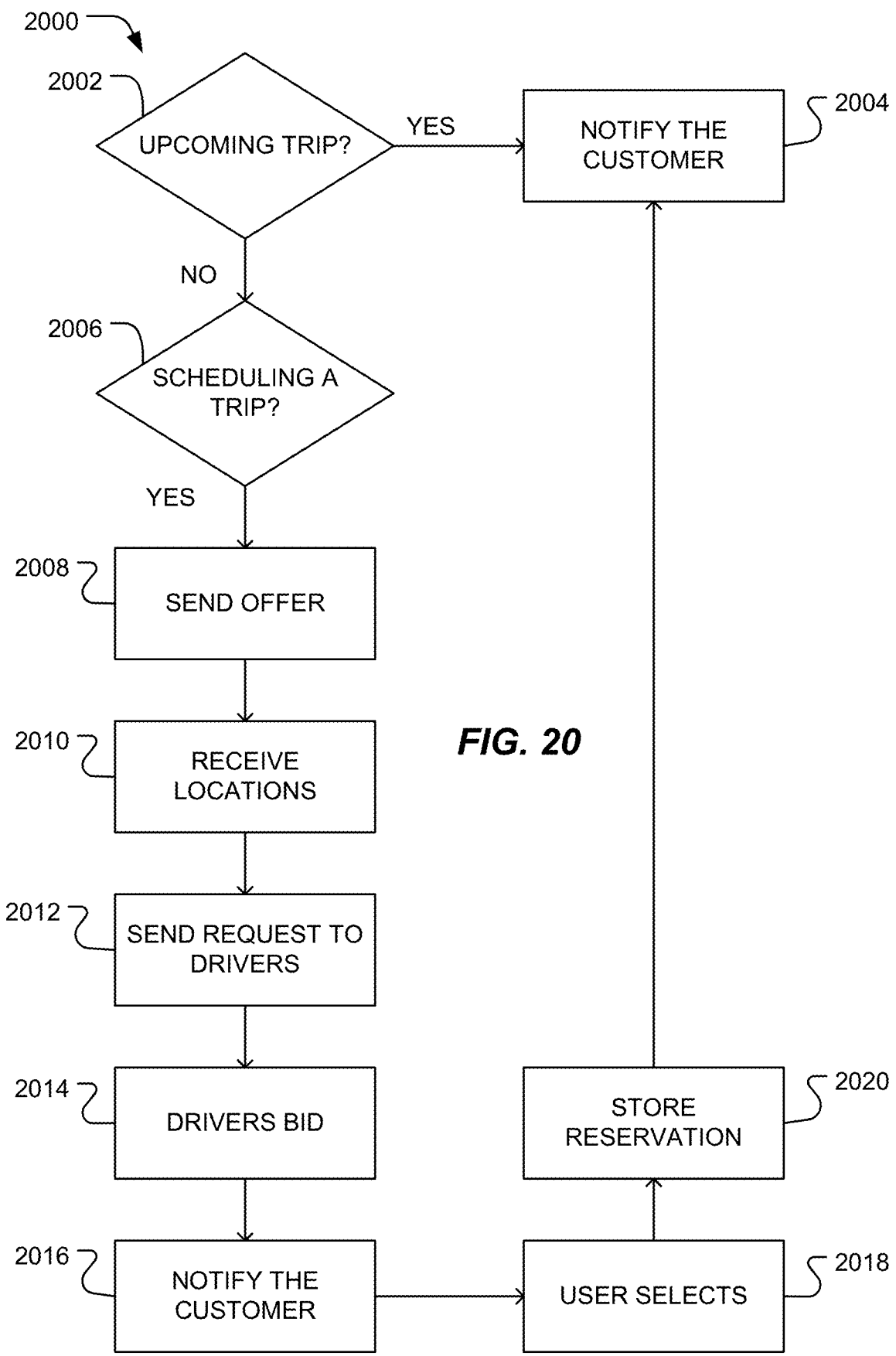

The system can also interact with the user to facilitate transportation services based on a reservation or based on other preferences in a user's profile. For example, as illustrated in FIG. 20, a method 2000 includes determining whether a user has upcoming travel or reservations, such as scheduled air travel or scheduled reservations for transportation services, as illustrated at 2002. Upcoming trips can indicate utilization of a transportation service to the location of the airline, boat, or train. The system can, for example, discover travel plans through access to a calendar, travel reservation systems, or email. For upcoming reservations, the system can store reservation information. When an upcoming trip exists, the system can prompt a customer to schedule a reservation for transportation services or can notify the customer of a scheduled reservation, as illustrated at 2004.

When no upcoming trips are identified, the system can determine, as illustrated at 2006, whether the user is scheduling a trip. For example, the system can determine when the user enters a calendar entry associated with travel. In another example, the system can be notified when a user accesses a travel reservation system. For example, the system can interact with third-party reservation systems to detect travel bookings. In another example, the system can determine through email when a reservation confirmation has been sent.

When the user is scheduling a trip, the system can send an offer to the user, as illustrated at 2008, through the user device. Alternatively, the system can supply an offer to the user through a website. In response to the offer, the user can provide to the transportation server, a set of locations associated with the travel, such as a home location and an airport location, a home location and a station location, or an airport location and a hotel location, as illustrated at 2010.

The server can identify service providers and can send a service request to the service providers, as illustrated at 2012. The service providers can offer to provide the transportation services, as illustrated at 2014. The server can receive the offers and can notify the customer of proposed fares and the associated offers, as illustrated at 2016.

A user can select a service provider, as illustrated at 2018, and the transportation server can store the reservation, as illustrated at 2020. The system can then notify the user, as illustrated at 2004, about the upcoming trip. For example, the system can remind the user about the travel by prompting the user at a set time prior to the start of the service.

Further, the system can monitor the progress of travel, such as airline schedules, to adjust reservations. For example, the system can monitor for delays in flights to determine how to adjust a planned fare to account for a delayed user.

Figure 21:
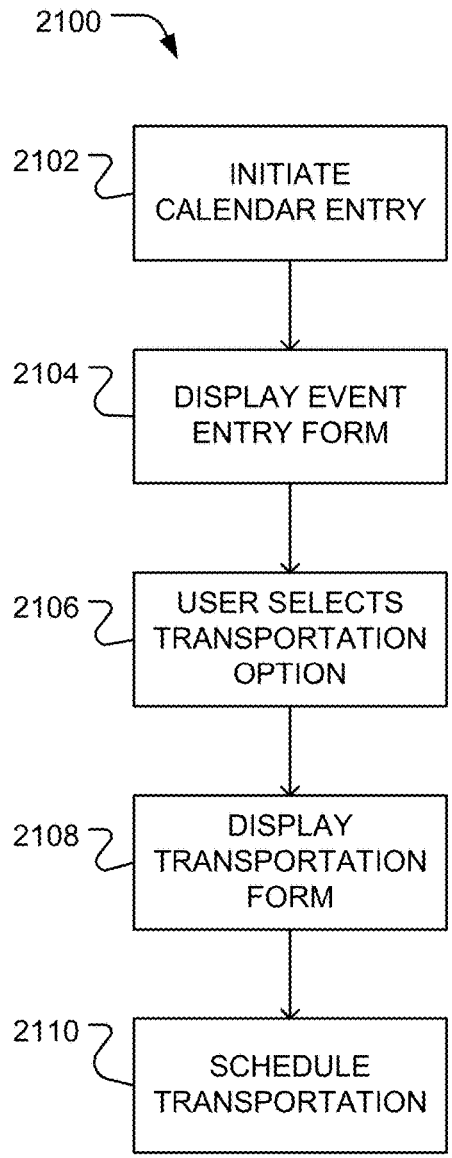

In a particular example, the transportation system can facilitate the offering of transportation services to the user when the user is entering a calendar entry into the calendar. For example, as illustrated in FIG. 21, a method 2100 includes initiating a calendar entry, as illustrated at 2102. In an example, the calendar entry can be entered on the user device. Alternatively, the calendar entry can be entered in a calendar program on the user device or on another computational device. Exemplary calendar programs include mobile calendar applications, Outlook™, cloud-based calendar programs, or any combination thereof.

As illustrated at 2104, the system can display an event form, through which, a user can select transportation options, as illustrated at 2106. The system can display the transportation form, as illustrated at 2108. The transportation form information can be used to schedule transportation services, as illustrated at 2110.

Figure 22:
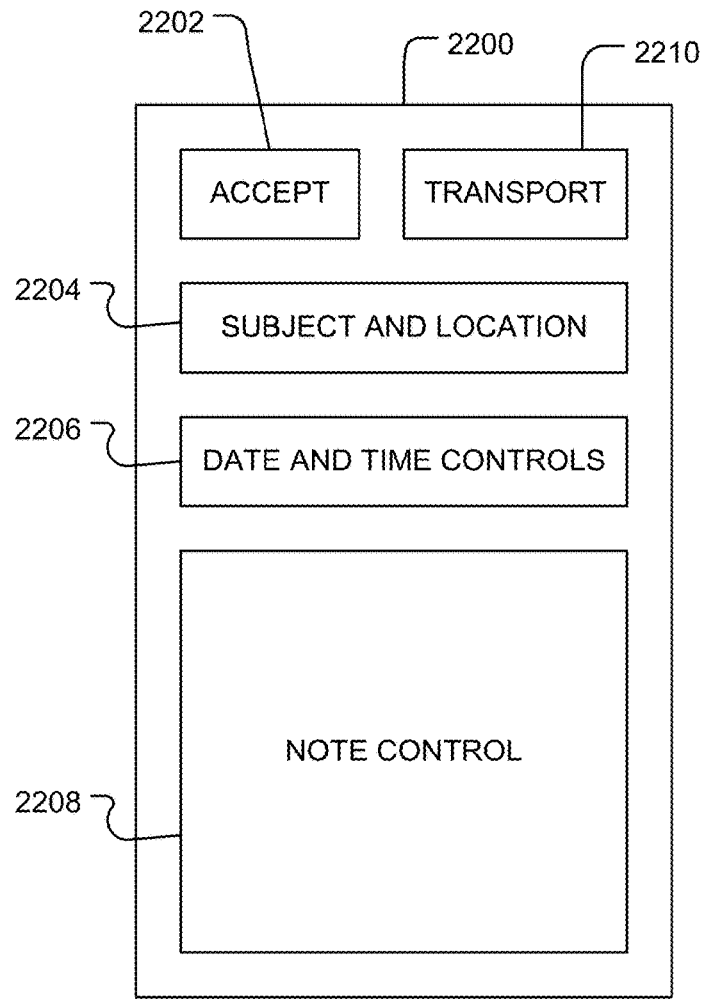
FIG. 22 includes an illustration of an exemplary event scheduling interface.

For example, as illustrated in FIG. 22, an event entry form 2200 can include data entry controls for subjects and locations of an event, as illustrated at 2204, as well as time control elements 2206 for entering the date and time of the associated event. The event entry form can further include a control for entry for notes, as illustrated at 2208. Generally, the system includes an accept button or send button to facilitate calendaring of the event, as illustrated at 2202. In addition, the event entry form can include a control for accessing a transportation service request form, as illustrated at 2210. Alternatively, the transportation service request form can be offered once the user accepts the subject location and date and time entries. In such a way, offers for transportation service can be integrated into calendaring programs.

Figure 23:
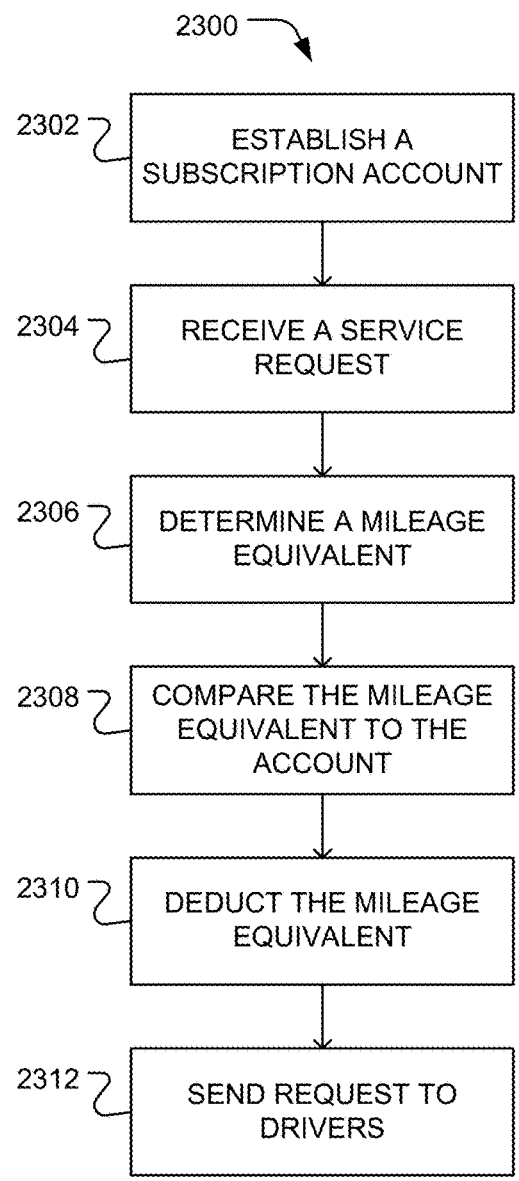

The system can also offer the option to establish a subscription account. The subscription account can include number of miles or mileage equivalents in exchange for periodic subscription payments. For example, as illustrated at FIG. 23, a method 2300 includes establishing a subscription account, as illustrated at 2302. In particular, the subscription account can include the option to periodically charge a user, as well as an amount of mileage equivalents available to the user. In an example, the provided mileage equivalents can be discounted from on-demand service charges.

When the system receives a service request, as illustrated at 2304, the system can determine initial location, destination, and start time associated with the travel. As illustrated at 2306, the system can determine a mileage equivalent of the proposed service request. The mileage equivalent can be determined based on heuristics or algorithms associated with the distance between the initial location and destination, as well as expected time to completion. For example, when a time to complete exceeds a threshold, the system can convert the additional time into mileage equivalents using a scale, algorithm, or heuristic. The mileage equivalents can also have a monetary equivalent.

As illustrated at 2308, the mileage equivalent of the requested service can be compared to the available mileage equivalents associated with the account. When the service is initiated, the mileage equivalent can be deducted from the available mileage equivalents associated with account, as illustrated at 2310, and the service request can be sent to potential service providers, as illustrated at 2312.

Figure 24:
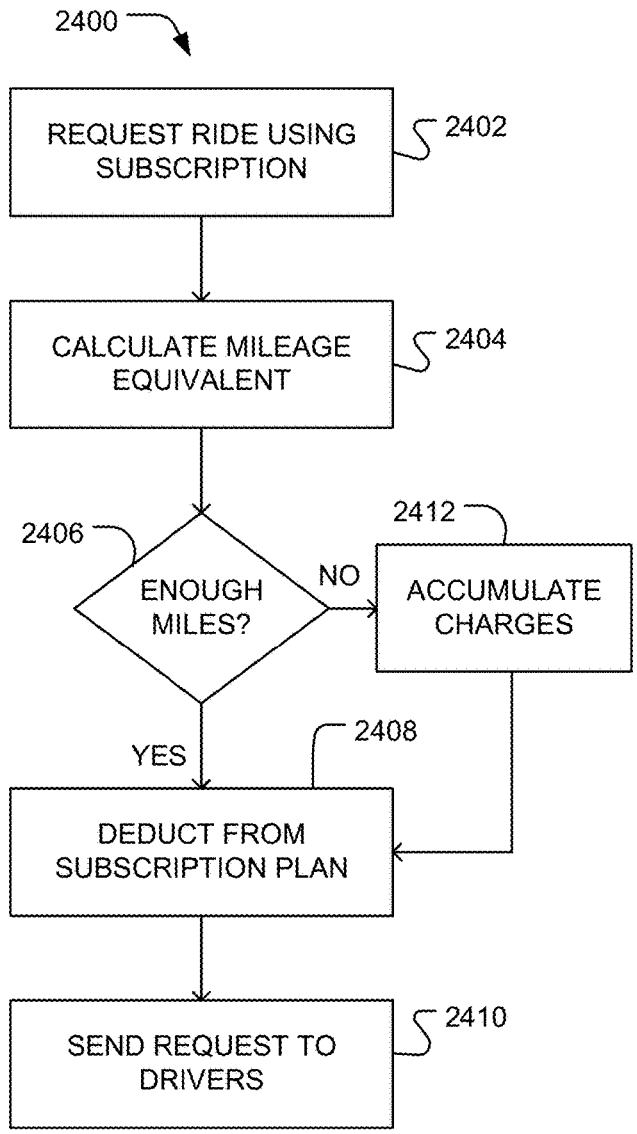
FIG. 23 FIG. 24, FIG. 25, and FIG. 26 include flow diagrams illustrating exemplary methods for arranging transportation services.

In another example illustrated in FIG. 24, a method 2400 includes receiving a service request form a user device associated with a subscription account, as illustrated at 2402. Based on the expected distance, and time to complete, or other factors, a mileage equivalent can be calculated for the requested service, as illustrated at 2404. The system can then compare the mileage equivalents to the number of mileage equivalents available to the account, as illustrated at 2406.

When there are not enough mileage equivalent associated with the account to cover the number of mileage equivalents associated with the service, additional charges can be accumulated to the user, as illustrated at 2412. When there are enough mileage equivalents associated with the account, the system can deduct the mileage equivalents from the subscription plan, as illustrated at 2408. The system can then send a service request to service providers, as illustrated at 2410.

Optionally, when completing a service, the user can enter a tip or gratuity that can be converted to mileage equivalents and deducted from the account.

Figure 25:
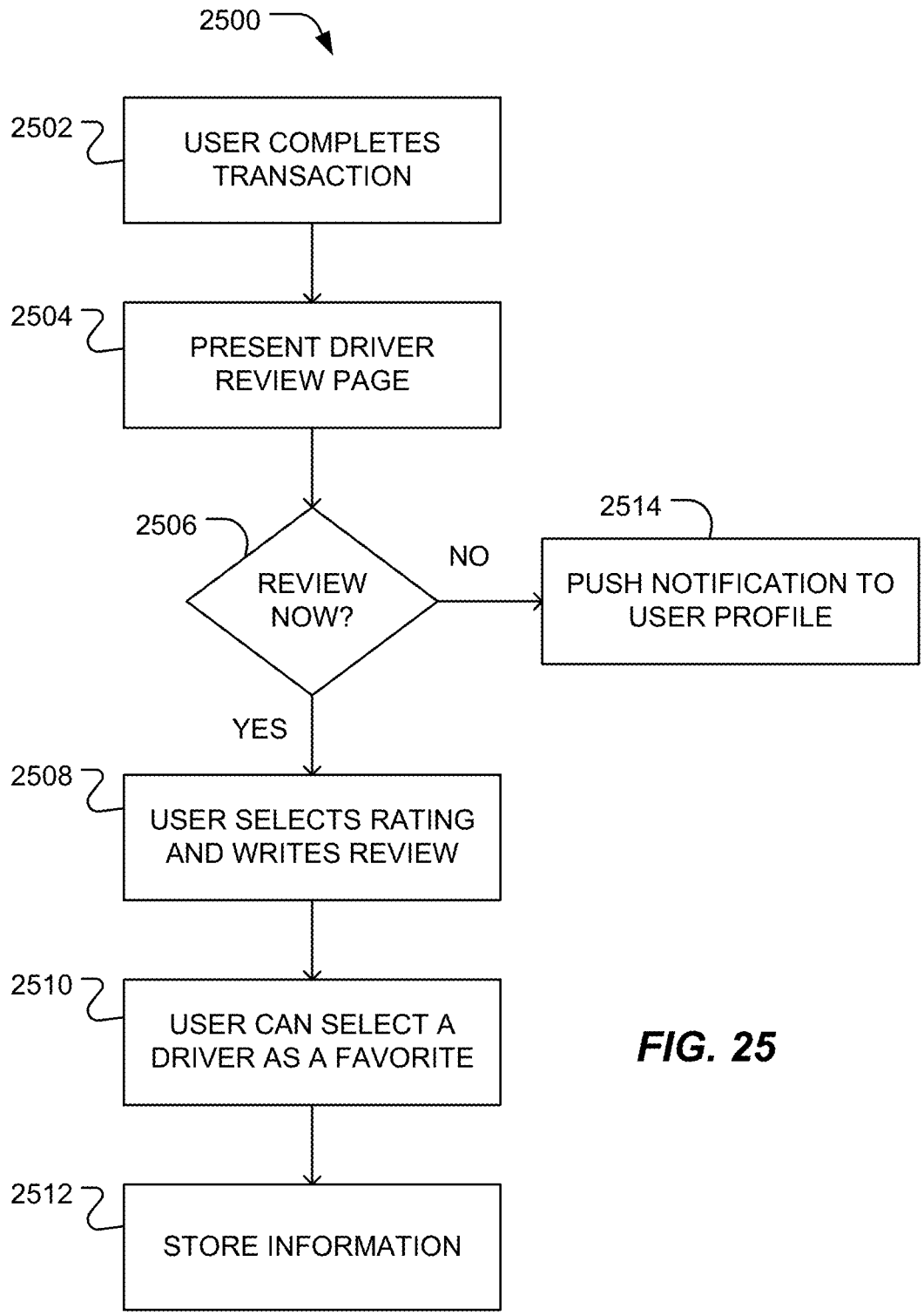

Following completion of a service, a user can be given the option to rate a driver or service provider. For example, as illustrated in FIG. 25, a method 2500 includes a user completing a transaction, as illustrated at 2502. For example, the system can determine whether a service is complete, and the user can optionally enter gratuity or tips. Such a transaction can be completed on the user device or on the service provider device.

Once the transaction is complete, the user can be presented through the user device a review or rating page associated with the service provider, as illustrated at 2504. The user can be given the option to review now, as illustrated at 2506. When the user decides not to review now, a push notification can be applied to the user profile, providing the option for the user to review or rate the service provider at a later time, as illustrated at 2514.

When the user selects to review the service provider, the user can select a rating and write a review, as illustrated at 2508. Additionally, the user can be provided the option to select the service provider or driver as a favorite, as illustrated at 2512. For example, selecting a driver as a favorite can influence the system to present the driver more often when the driver is available for a particular service request by the user. The transportation server can store the information, as illustrated at 2512.

Figure 26:
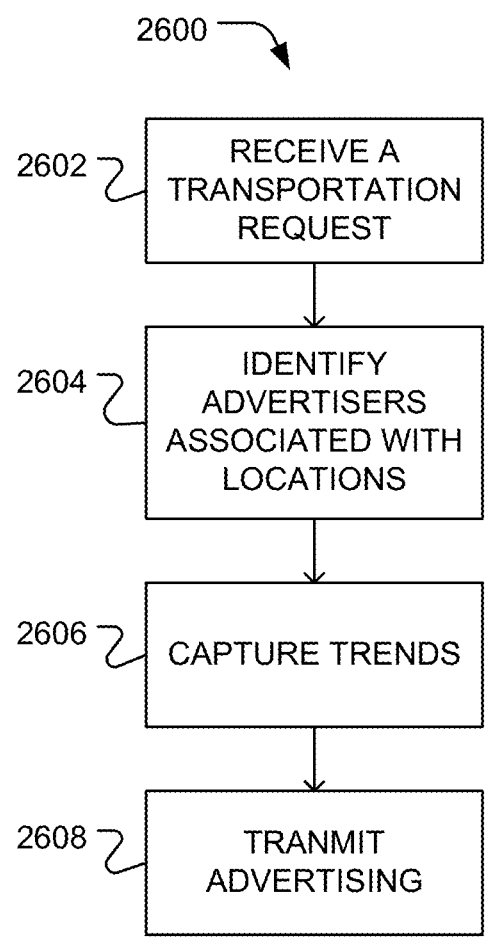

The system can further provide additional advertising or notifications to the user. For example, as illustrated in FIG. 26, a method 2600 includes receiving a transportation request, as illustrated at 2602. The transportation request can include an initial location, final destination and time of service.

The system can identify advertisers associated with locations associated with the service request, as illustrated at 2604. Exemplary locations include the initial location, the final destination, or locations in between. In a particular example, the system identifies a location and can identify advertisers associated with the location.

In an example, the system can capture trends in locations for advertising, as well as viewing of advertising, as illustrated at 2606. For example, the system can identify that at particular times of day a significant number of fares travel to a particular location. In an example, the system can identify that around lunch time a significant number of fares traverse between office locations and regions proximal to restaurants. Such trends can assist with identifying advertisers and informing potential advertisers of statistics associated with their target audience.

The system can then transmit advertising to the user device, as illustrated at 2608. Alternatively, the system can transmit advertising to the service provider device.

Figure 27:
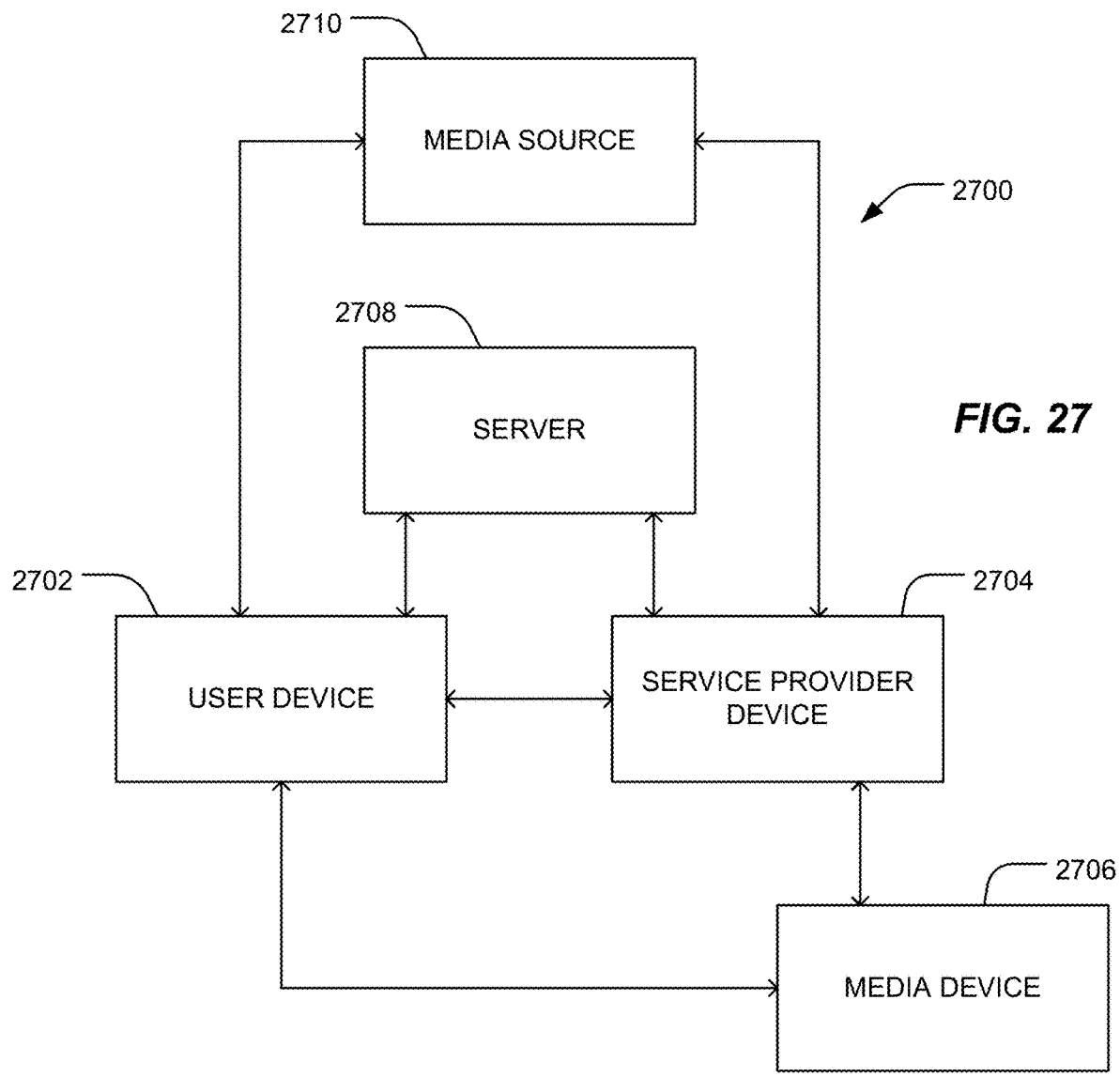
FIG. 27 includes an illustration of an exemplary system for managing media playback.

In an example, the system can facilitate the provision of environmental preferences within the vehicle based on user preferences. For example, the system can facilitate interaction with the service provider that provides to the user the option to control media playback within a vehicle. For example, as illustrated in FIG. 27, a system 2700 includes a user device 2702 that interacts with a transportation server 2708 to request a transportation service. The transportation server 2708 can interact with the service provider device 2704 to provision the transportation service. For example, the user device 2702 and the transportation server 2708 can communicate over a cellular data network or a wide area wireless network. Similarly, the transportation server 2708 can interact with the service provider device 2704 over a cellular data network or wide area wireless network.

In an example, the transportation server 2708 can provide to the user device 2702 data associated with interacting with the service provider device 2704. For example, such data can include parameters associated with addressing the service provider device 2704. Such parameters can, for example, include network address parameters or beacon parameters associated with the service provider device 2704 so that the user device 2702 can recognize the service provider device 2704. In another example, the transportation server 2708 can provide to the service provider device 2704 information about communicating with the user device 2702. Such information can include parameters associated with accessing the user device 2702, such as beacon addresses or network addresses of the user device 2702. As such, the user device 2702 and the service provider device 2704 can recognize each other and initiate a network connection.

Optionally, the service provider device can be communicatively coupled to a media device 2706. In an example, the media device 2706 is an audio system of a vehicle. The service provider device 2704 can interact with the media device 2706 through a wired connection. Exemplary wired connections include analog audio cables or wired network connections, such as USB connections. In another example, the service provider device 2704 can interact with the media device 2706 through a wireless network, such as a wireless personal area network. In an example, the wireless personal area network is a wireless network operating at frequencies in a frequency range of 2.0 GHz and 2.6 GHz or using protocols, such as a frequency hopping spread spectrum protocol. In a particular example, the service provider device 2704 can interact with the media device 2706 using a Bluetooth™ standard (e.g., Bluetooth 4.0).

In an example, a user can facilitate the selection of a music preference by providing through the user device 2702 preferred music genres, radio stations, or playlists to the server 2708. The server 2708 can provide the user preferences to the service provider device 2704 and the service provider can implement such preferences on the media device 2706. Such preferences can include accessing a remote media source 2710 over a cellular data network or wide area wireless network, such as internet-based music streaming services, or accessing broadcast media, such as AM, FM, or satellite radio.

In another example, the user device 2702 using parameters provided by the server 2708 can interact with the service provider device 2704 to form a network connection. The user device 2702 can transmit to the service provider device 2704 media content that can be directed by the service provider device 2704 to the media device 2706 for playback. In an example, the user device 2702 can include encoded music stored on the user device 2702, and can decode and transmit audio data to the service provider device 2704, which facilitates playback of the media content through the media device 2706. In an example, the user device 2702 can access a media source 2710 over a cellular data or wide area wireless network and can stream media content through the user device 2702 and to the service provider device 2704, which facilitates playback of the media content through the media device 2706.

In an alternative example, the user device 2702 can interact with the service provider device 2704 to determine network parameters associated with network formed between the service provider device 2704 and the media device 2706. In such a manner, the user device 2702 can mimic the network connection between the service provider device 2704 and the media device 2706. Accordingly, the user device 2702 can facilitate playback of media content through the media device 2706 by mimicking the network connection.

Figure 28:
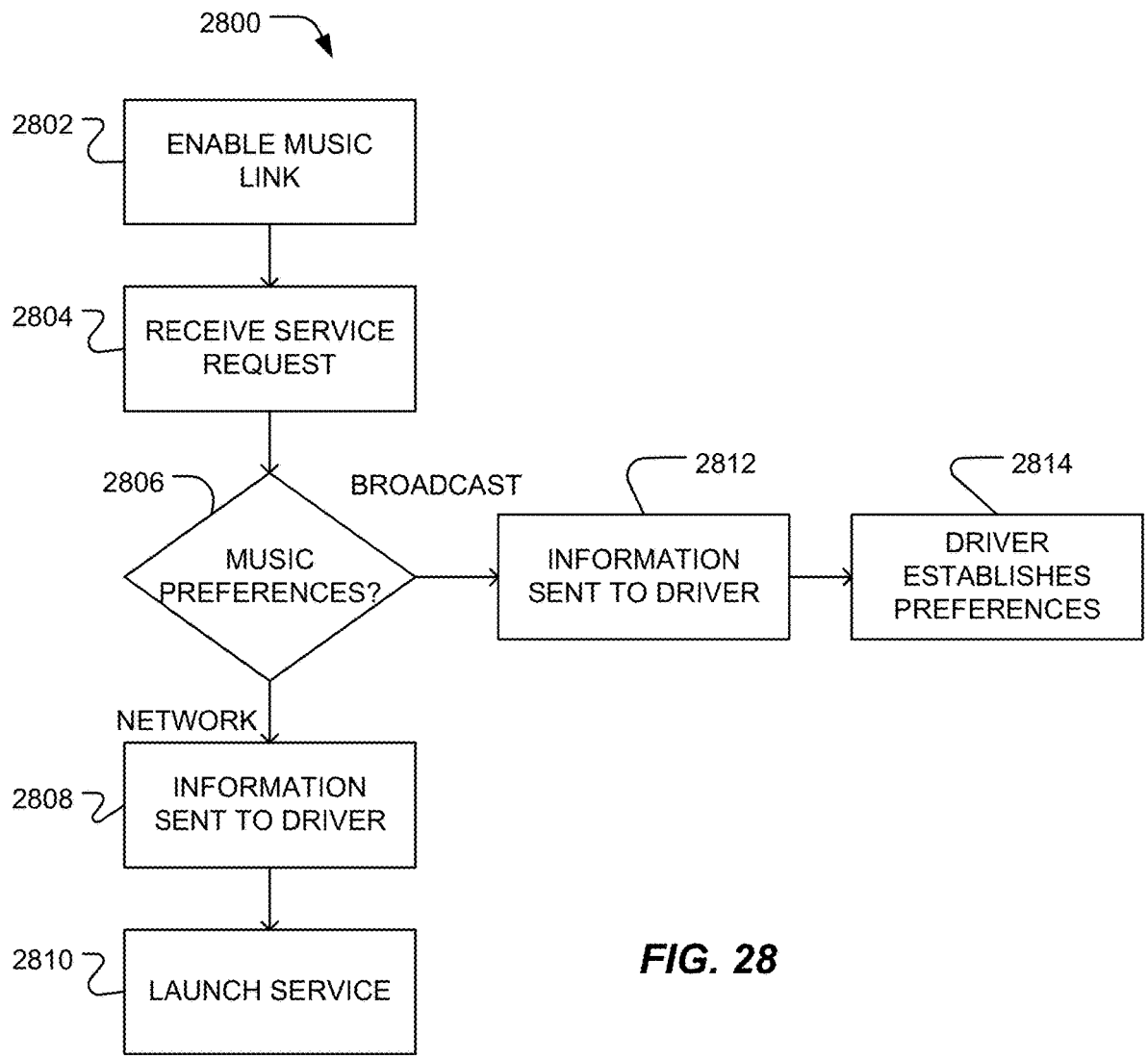
FIG. 28, FIG. 29, and FIG. 30 include flow diagrams illustrating exemplary methods for controlling media playback.

In a further example, FIG. 28 illustrates an exemplary method 2800 that includes enabling a music link option by the user device, as illustrated at 2802. A transportation server can receive a service request, as illustrated at 2804. When facilitating the transportation service, the transportation server can determine a music preference, as illustrated at 2806. If the music preference includes a broadcast media, the system can send information regarding the broadcast media preference to the service provider, as illustrated at 2812, and the service provider can establish media playback in accordance with the user's preferences, as illustrated at 2814. For example, the service provider can turn on a radio to a desired broadcast radio station.

When the music preference includes a network music preference, such as Pandora™ Apple™ Music, Beats™, I-Heart Radio™, Amazon™ music, among others, or any combination thereof. The information can be sent to the service provider, as illustrated at 2808. Providing that the service provider has access to the preferred networked media, the service provider can access the service, as illustrated at 2810. Similarly, the service provider can access available playback lists or music genres available through streaming media.

Figure 29:
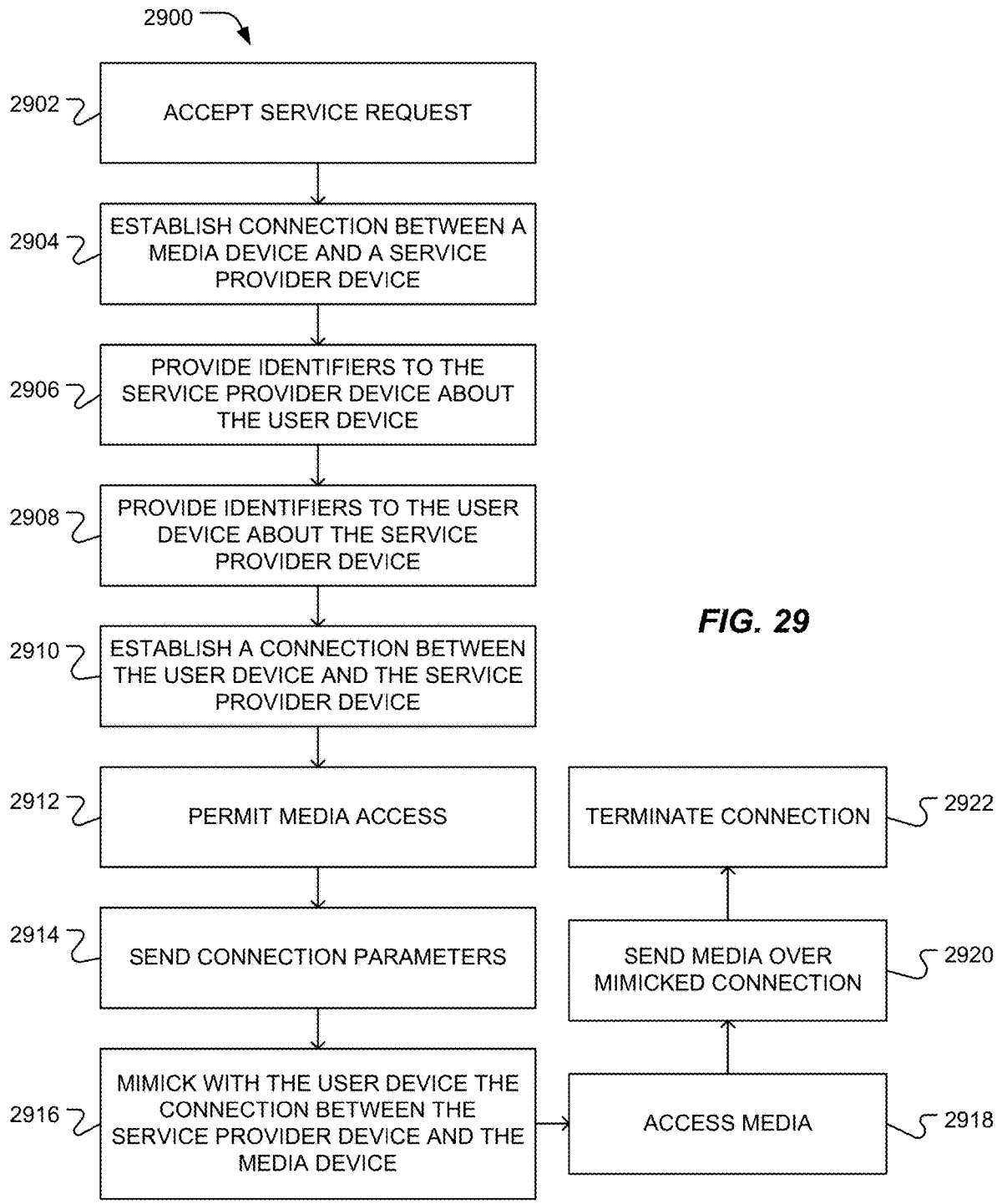

In another example illustrated in FIG. 29, a method 2900 includes accepting a service request, as illustrated at 2902. The service provider can establish a connection between the service provider device and the media device, as illustrated at 2904. For example, the service provider can create a wireless connection with the media device. Alternatively, the service provider device can have a wired bus connection, such as a USB connection, to the media device. In a further alternative, the service provider device can have an analog connection to the media device. For example, the media device can include a car radio.

In an example, the transportation server can provide identifiers to the service provider device about the user device, as illustrated at 2906. Exemplary identifiers include beacon identifiers or network addresses associated with the user device. In a further example, as illustrated at 2608, the transportation server can provide identifiers to the user device regarding the service provider device, such as an identifier that can include network addresses or addresses of the service provider device.

As illustrated at 2910, a connection can be established between the user device and the service provider device. The network connection can be a wireless personal area network.

As illustrated at 2912, the service provider device can prompt for permission to provide media access to the user device. When such permission is provided, the service provider device can send network connection parameters to the user device, as illustrated at 2914. In particular, when the service provider device and the media device are connected through a wireless network connection, connection parameters, such as addresses and passwords or encryption protocols, can be provided to the user device. Using such parameters, the user device can mimic the connection between service provider device and the media device, as illustrated at 2916.

The user device can access media content, as illustrated at 2918. For example, the media content can be stored on the user device and can be decoded for playback on the media device. In another example, the user device can access through a cellular data network or wide area wireless network streaming media content and provide such media content to the media device through the mimic network connection, as illustrated at 2920.

Once the service has ended, the system can terminate the connection between the user device and the media device. For example, the user device can be directed to delete parameters associated with accessing the media device. Such termination can be prompted by the service provider device, the user device, or the remote transportation server. In a particular example, the service provider can be prompted through the service provider device to break access to the mimicked connection. In another example, the transportation server can recognize an end to the service and can facilitate the deletion of the network parameters from the user device. In a further example, the user device when finalizing the transaction indicating a completion of service can automatically delete the mimicked network parameters.

Figure 30:
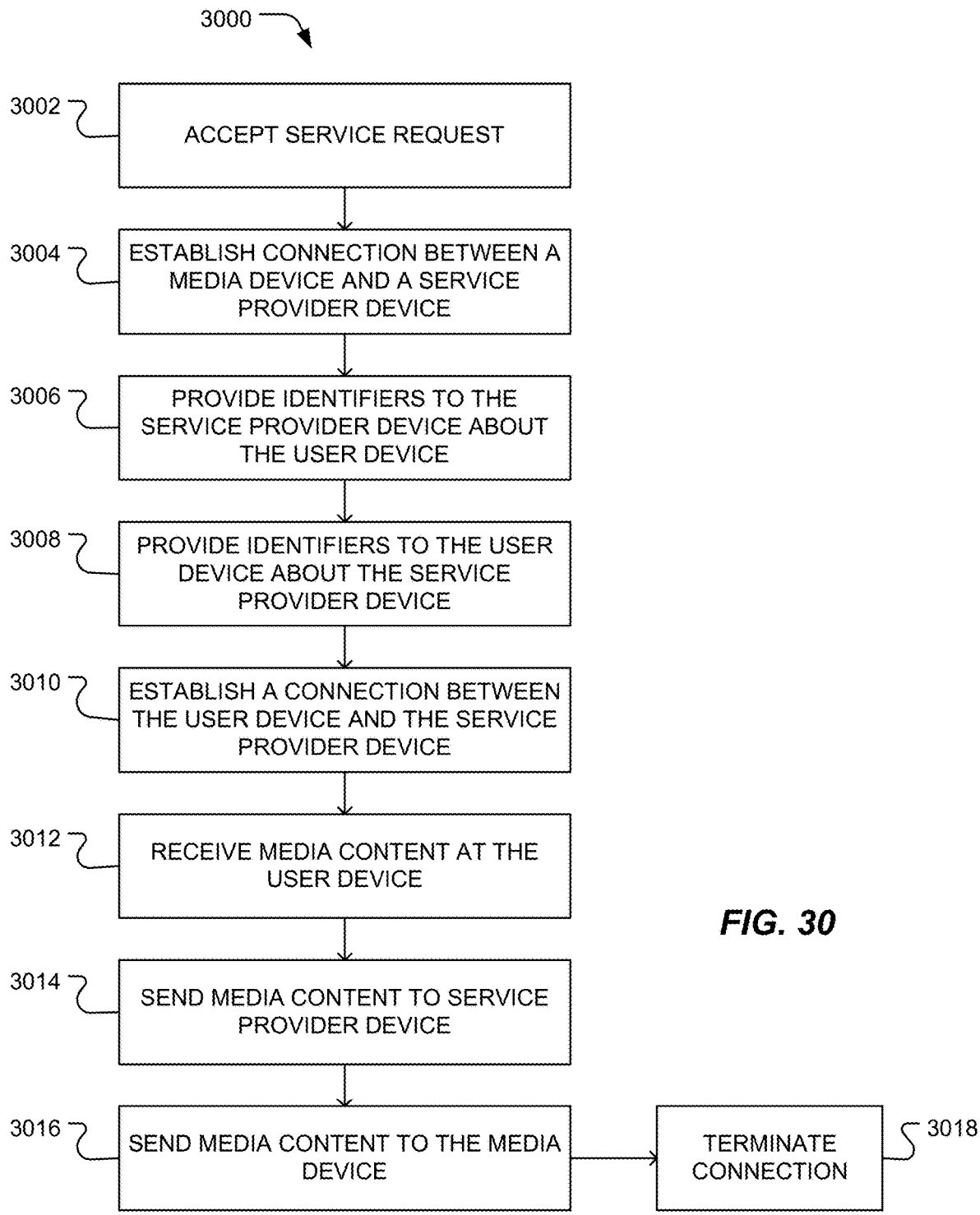

In an additional example illustrated in FIG. 30, a method 3000 includes accepting a service request, as illustrated at 3002. The service provider device can establish a connection between service provider device and the media device, as illustrated at 3004. For example, the service can create a wireless connection with the media device. Alternatively, the service provider device can have a wired connection to the media device. In a further alternative, the service provider device can have an analog connection to the media device. For example, the media device can include a car radio.

In an example, the transportation server can provide identifiers to the service provider device about the user device, as illustrated at 3006. Exemplary identifiers include beacon identifiers or network addresses associated with the user device. In a further example, as illustrated at 3008, the transportation server can provide identifiers to the user device regarding the service provider device, such as an identifier that can include network addresses or beacon addresses of the service provider device.

As illustrated at 3010, a connection can be established between the user device and the service provider device. The network connection can be a wireless personal area network.

As illustrated at 3012, the user device can receive media content. For example, the user device can decode media content from media files stored on the user device. In another example, the user device can access media content from a media server, for example, streamed over a cellular data network or wireless wide area network.

The user device can send the media content to the service provider device, as illustrated at 3014. The service provider device can send the media content to the media device, as illustrated at 3016.

As illustrated at 3018, the connection between the user device and the service provider device can be broken at an end of the service. Such an end of the service can be determined by the service provider using the service provider device. In another example, a remote transportation server can recognize an end of the service and direct that the user device delete network connection parameters. In a further example, the user device can recognize an individual transaction and automatically delete network connection parameters.

Figure 31:
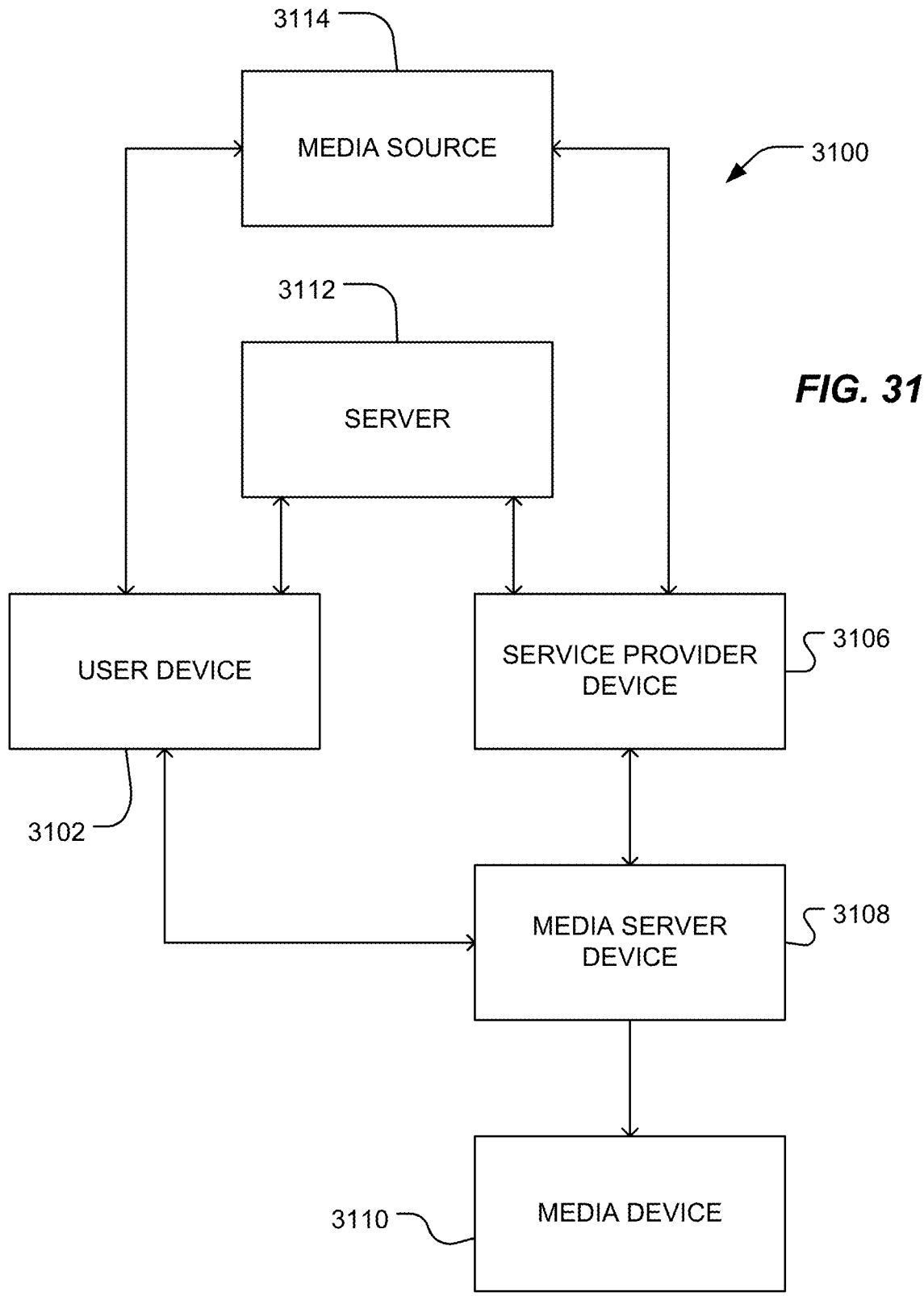
FIG. 31 includes an illustration of an exemplary system for managing media playback.

In an alternative example illustrated in FIG. 31, a system 3100 includes a user device 3102, which can interact with a transportation server 3112 to establish service from the service provider associated with the service provider device 3106. In addition, the system 3100 can also include a media server device 3108 associated with the media device 3110, such as a vehicle audio system. A network connection can be established between the service provider device 3106 and the media server device 3108, for example, through a wireless network, such as a wireless personal area network.

The service provider device 3106 can interact with the media server device 3108 to connect to the media device 3110. The media server device 3108 can be connected with the media device 3110. In an example, the media server device 3108 can be connected using a wired connection, such as an analog connection to the media device 3110. In another example, the wired connection can be a bus connection, such as a USB connection. In a further example, the media server device 3108 can be wirelessly connected to the media device 3110, for example, through a wireless personal area network.

The transportation server 3112 can provide to the user device 3102 access parameters associated with the media server device 3108. The user device 3102 can establish a network connection with the media server device 3108. The user device 3102 can direct media playback through the media server device 3108 connected to the media device 3110. For example, the user device 3108 can decode media content stored on the user device 3102. In another example, the user device 3102 can interact with a media source 3114 over a cellular data network or wide area wireless network.

In a particular example, the service provider device includes applications that prompt the service provider to provide permission for the user device to access the media server device 3108. In addition, the service provider device 3106 can direct the disconnection of the network connection between the media server device 3108 and the user device 3102. For example, the service provider device 3106 can direct disconnection by communication with the transportation server 3112 or communication through the media server device 3108, directing the user device 3102 to delete network parameters associated with interacting with the media server device 3108. Alternatively, the user device 3102 can recognize an end of service and automatically delete the network parameters associated with accessing the media server device 3108.

In an alternative example, the user device 3102 can communicate music preferences, such as through the transportation server 3112. The service provider device 3106 can access the media server device 3108 to implement the music preferences. In a particular example, the service provider device 3106 can access a remote media source 3114 and stream media content to the media server device 3108 to be played on the media device 3110.

Figure 32:
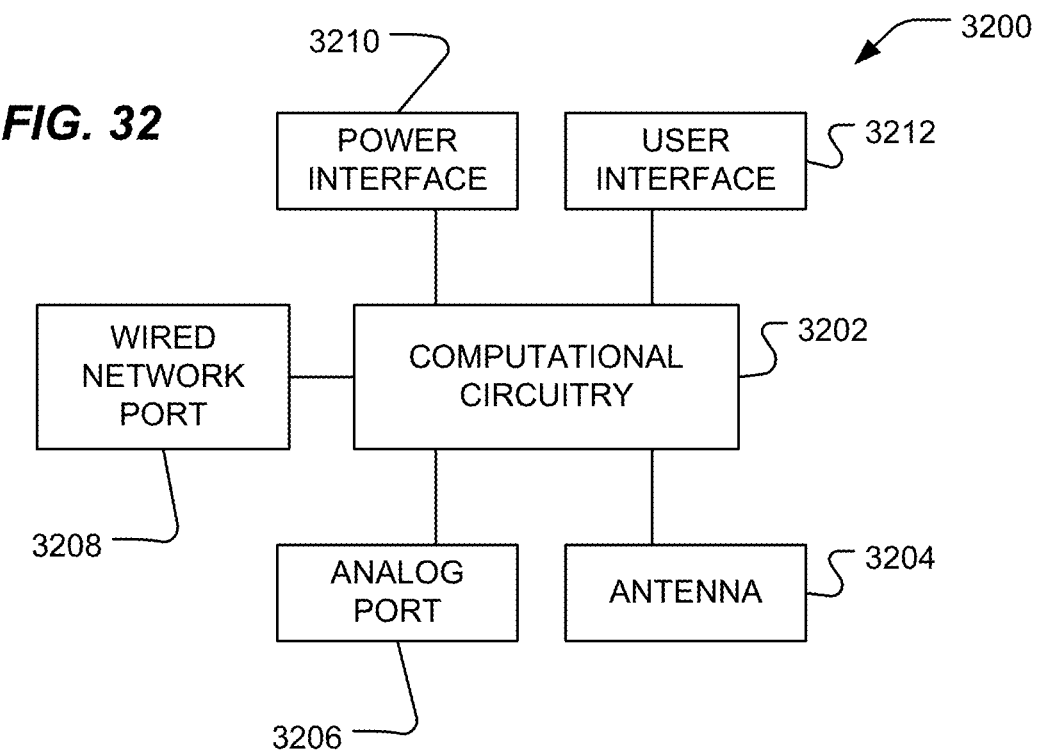
FIG. 32 includes an illustration of an exemplary circuitry of a media server device.

In an example, a media server device includes an antenna to provide wireless communication and optionally an analog port or wired network port. For example, FIG. 32 illustrates an exemplary media server device 3200, which includes computational circuitry 3202 to manage network connections and retransmit media content to a media device. The computational circuitry 3202 includes a processor and memory storage.

The computation circuitry 3202 is in communication with an antenna 3204. Through the antenna 3204, the computational circuitry 3202 can establish a wireless connection with a user device, a service provider device, or a wireless accessible media device. For example, the computational circuitry 3202 through the antenna 3204 can establish a wireless personal area network. In another example, the computational circuitry 3202 through the antenna 3204 can access a cellular data network or a wide area wireless network.

The computational circuitry 3202 can be in communication with an analog port 3206 or a wired bus port 3208. For example, the media server device 3200 can connect to an analog input of a media device through the analog port 3206. In another example, the media server device 3200 can connect to the media device via a wire bus port 3208. For example, the wired bus port 3208 can be a universal serial bus (USB) port.

In addition, the computational circuitry 3202 optionally can be connected to a power interface 3210 or a user interface 3212. The power interface 3210 can provide power to the computational circuitry 3202 and other connected interfaces, antennas or ports. In an example, the power interface 3210 can include a battery. In another example, the power interface 3210 can include an interface to a car power plug. In a further example, the power interface 3210 can take the form of a USB interface or form part of the USB wired bus port 3208. The user interface 3212 can include buttons, switches, pointers, screens, touchscreens, or any combination thereof.

Figure 33:
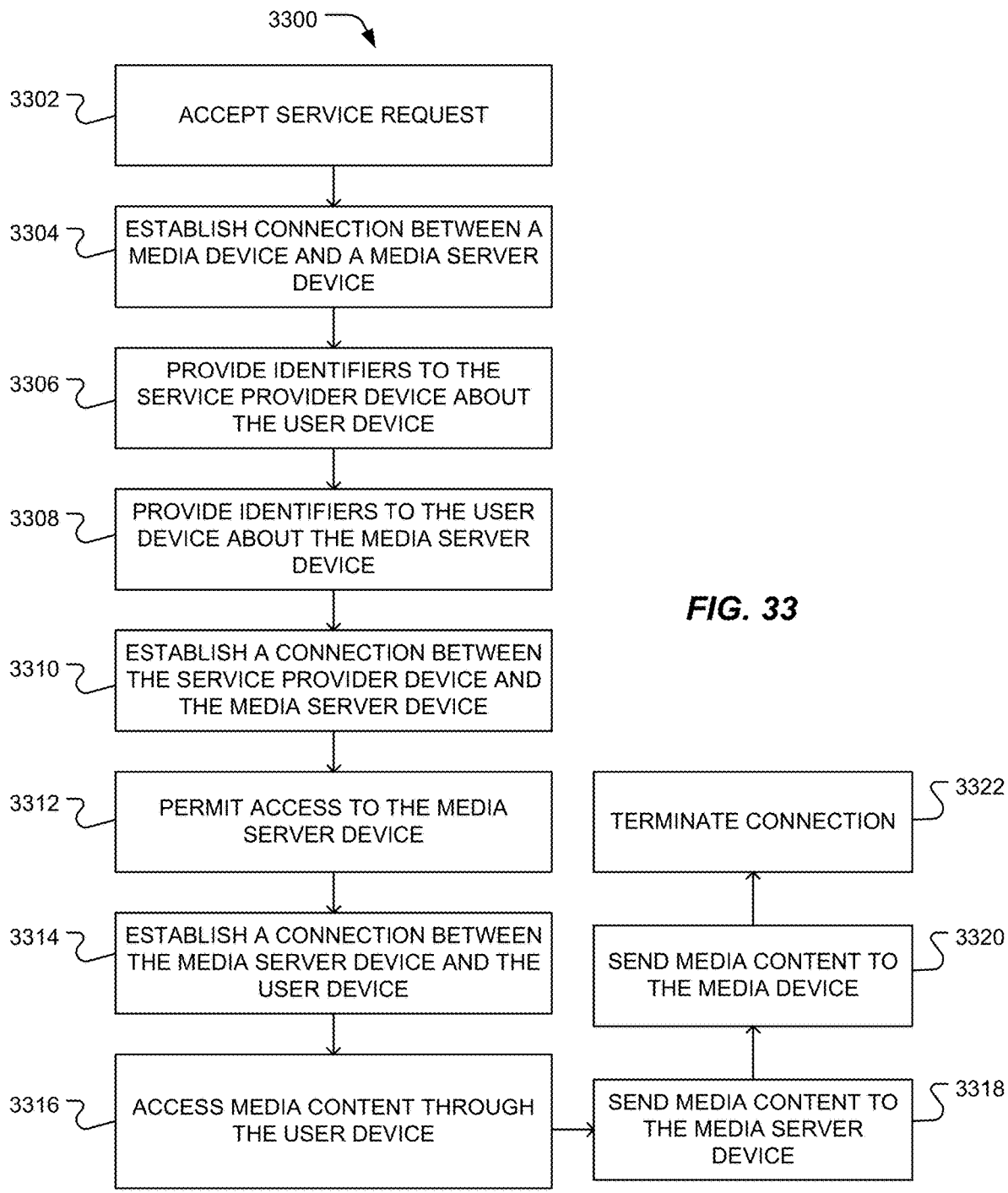
FIG. 33 includes a flow diagram illustrating an exemplary method for managing media playback.

In an example illustrated in FIG. 33, a method 3300 includes accepting a service request, as illustrated at 3302. A connection between the media server device and the media device can be established, as illustrated at 3304. For example, the connection can be a wired connection, such as an analog connection or a wired bus connection. In another example, the connection can be a wireless connection, such as through a wireless personal area network.

In an example, the transportation server can provide identifiers to the service provider device about the user device, as illustrated at 3306. Exemplary identifiers include beacon identifiers or network addresses associated with the user device. In a further example, as illustrated at 3308, the transportation server can provide identifiers to the user device regarding the media server device, such as an identifier that can include network addresses or beacon addresses of the service provider device.

As illustrated at 3310, a connection can be established between the media server device and the service provider device. The network connection can be a wireless personal area network.

The service provider device can be prompted to permit access to the media server device, as illustrated at 3312. For example, the service provider device can display an interface to allow access.

As illustrated at 3314, the media server device and user device can establish a connection. The user device can access media content, as illustrated at 3316, for example, that is stored on the user device or streamed through a cellular data network or wide area wireless network. The media content can be provided to the media server device, as illustrated at 3318, through the connection between the media server device and the user device. The media server device can send the media content to the media device for playback, as illustrated at 3320.

Further, the connection between the user device and the media server device can be terminated, as illustrated at 3322. In an example, the service provider device can direct the media server device to disconnect the network connection from the user device. In another example, the transportation server can direct the user device to delete network parameters associated with interacting with the media server device. In an additional example, the user device can recognize an end of service and delete parameters associated with accessing the media server device.

Figure 34:
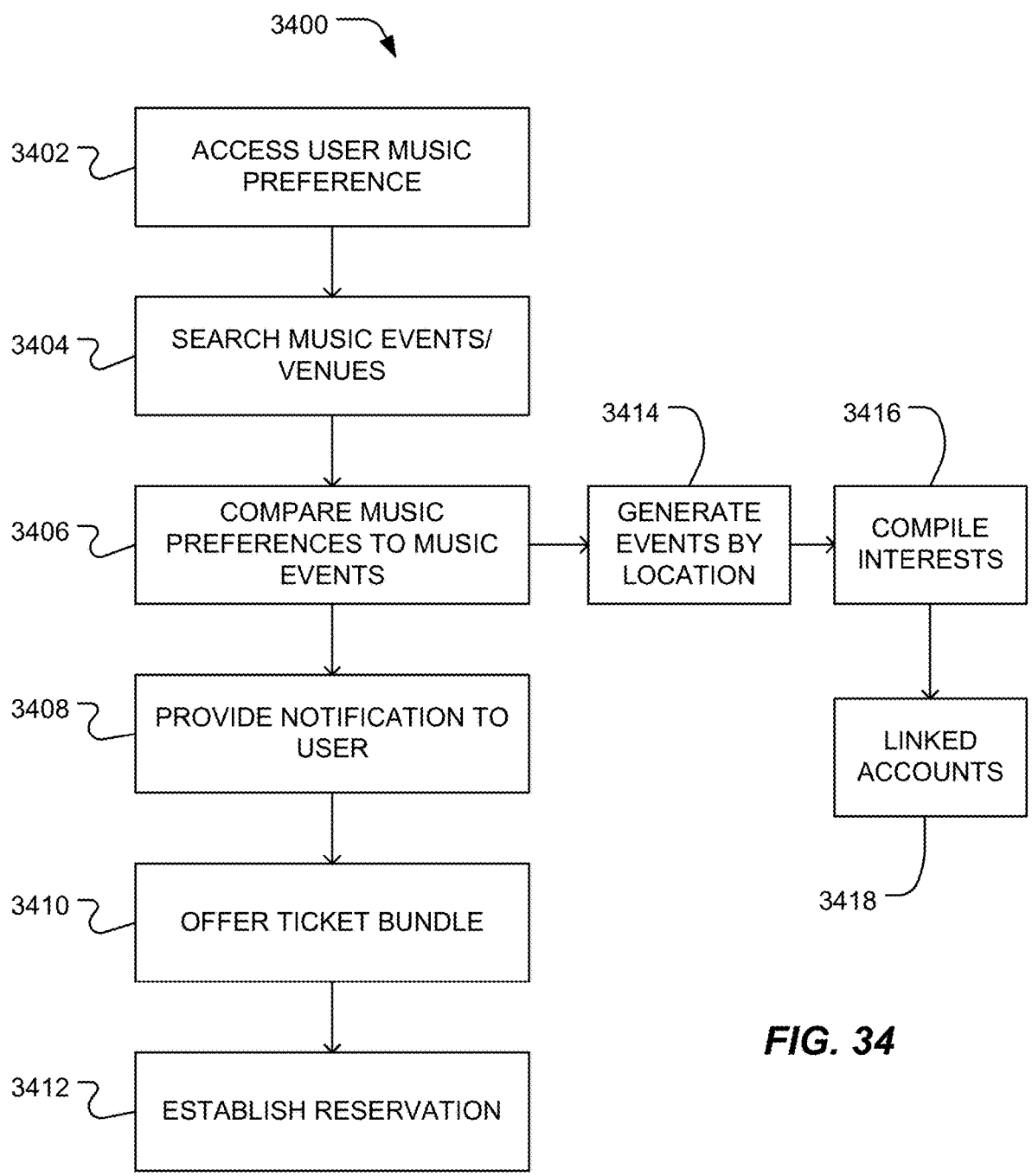
FIG. 34, FIG. 35, FIG. 36, FIG. 37 include flow diagrams illustrating exemplary methods for arranging transportation.

In an additional example, the user's music preferences can be used to offer bundled transactions associated with media events. For example, as illustrated in FIG. 34, a method 3400 includes accessing a user music preferences, as illustrated at 3402. The system can search for music events or venues, as illustrated at 3404, and can compare the music preferences of a user to the music events or venues, as illustrated at 3406. In an example, the events or venues can include ticketed music events.

As illustrated at 3414, the system can generate a set of events by location, compile interest associated with users, as illustrated at 3416, or link accounts, as illustrated at 3418. For example, a user can link accounts associated with ticket booking services, such as Ticketmaster or similar ticketing agents. Further, the system can interact with such ticketing services or agents to detect booking of an event and offer transportation services through the ticketing agent.

Further, the system can provide a notification to the user of an upcoming event, as illustrated at 3008. For example, the user can be given a notification through an application on the user device. When the user is interested in a particular event, the system can offer a ticket bundle, as illustrated at 3410. An exemplary ticket bundle can include a set of tickets to a music event or venue, as well as an offer for transportation to that event.

When the user accepts the offer, purchasing the tickets and a transportation service, the system can establish a reservation, as illustrated at 3412.

Figure 35:
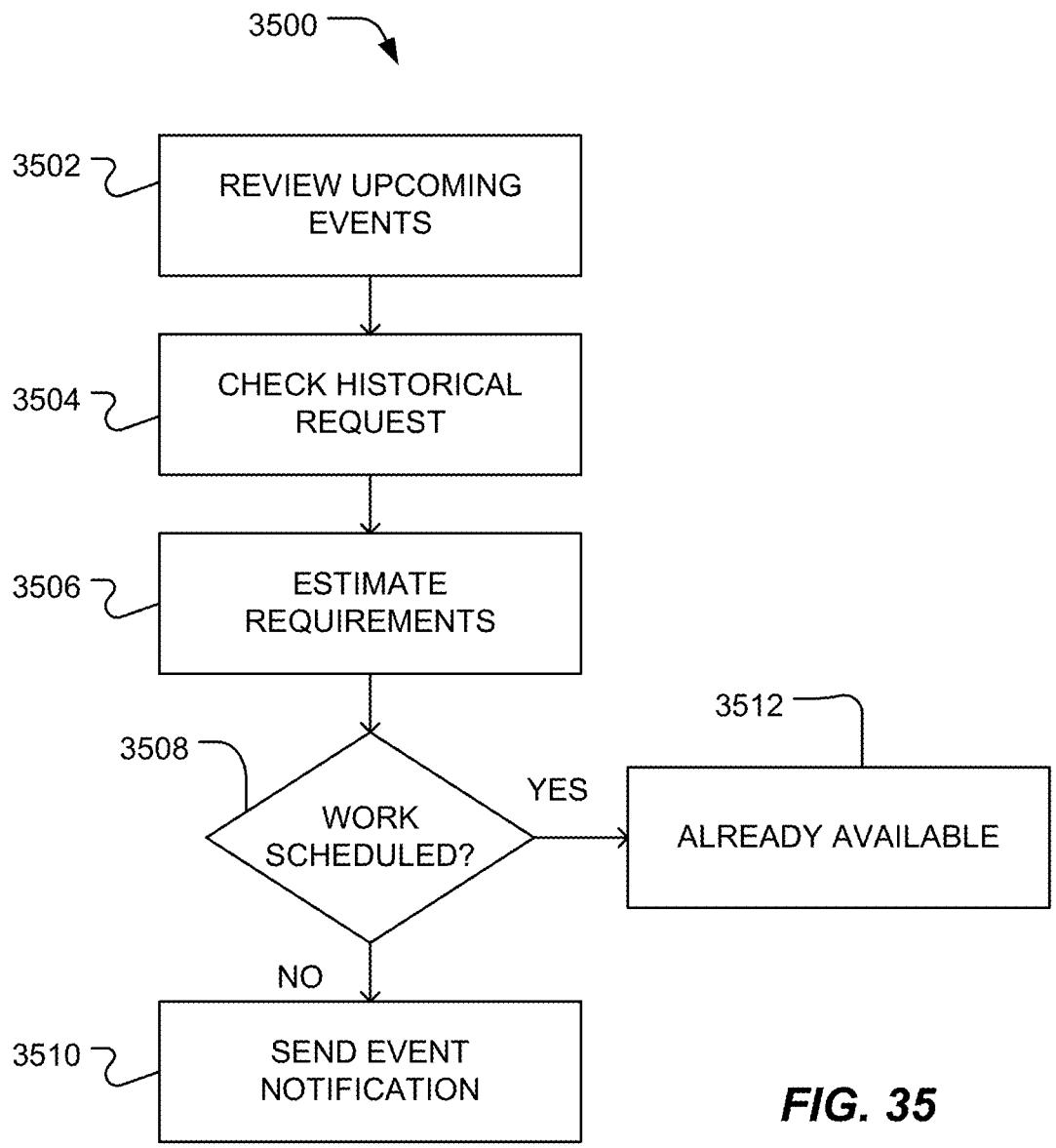

The system can use a variety of data sources to determine supply and demand associated with providing transportation services. For example, as illustrated in FIG. 35, a method 3500 includes reviewing upcoming events, as illustrated at 3502. In an example, the system can check historical request associated with similar events, as illustrated at 3504, and can estimate the demand for drivers and rides, as illustrated at 3506.

The system can check to see whether a service provider's preferences, such as their preferred time of operation, match the events. In the event the work schedule matches the upcoming event schedule, the provider is considered available, as illustrated at 3512. Optionally, the system can direct the service provider to be in an area convenient to the event.

When the work schedule does not match the event, a service provider can be sent an event notification, encouraging service provider to be available to serve the event, as illustrated at 3510.

Figures 36, 37:
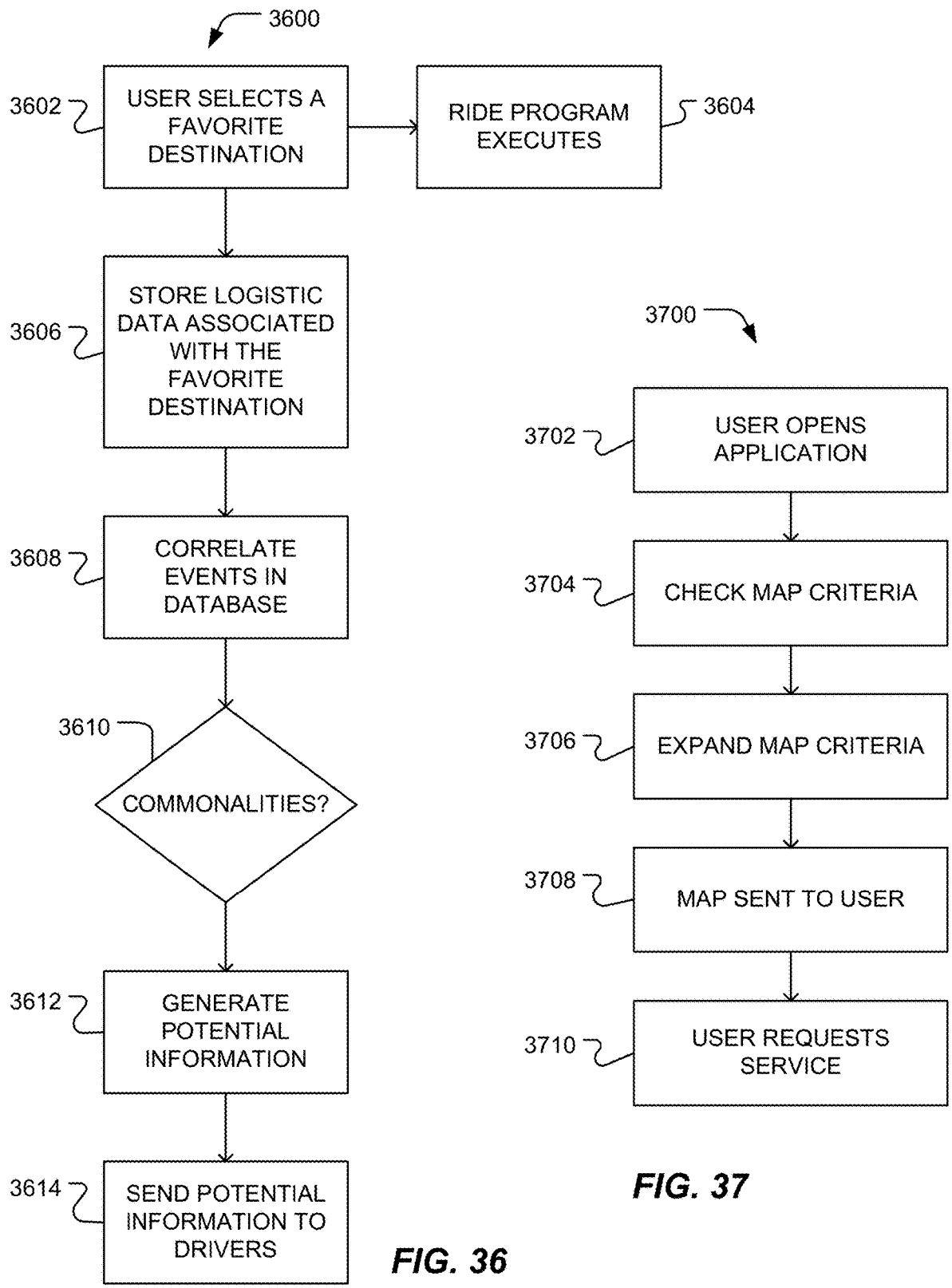

In another example, the system can assist with determining demanded at a particular location at particular times of day. For example, as illustrated in FIG. 36, a method 3600 includes a user selecting a favorite destination, as illustrated at 3602. When the user selects the favorite destination, a ride procedure executes to facilitate provisions of the service, as illustrated at 3604.

In addition, the system can store logistics data associated with favorite destination, as illustrated at 3606. The logistics data can include start location, destination, and time of day associated with user service request associated with the favorite destination.

The system can correlate events in the database with the favorite destination, as illustrated at 3608. When the system determines that such correlations exist, as illustrated at 3610, the system can generate potential service information associated with potential demand for service providers, as illustrated at 3612. In addition, the system can send such potential service information to service providers, as illustrated at 3614, to encourage service providers to be available to meet the demand associated with commonalities.

When identifying service providers, the system can identify an area around a start or initial location associated with a service request. When the identified area does not include a sufficient number of service providers, the system can expand the area to find additional service providers. For example, FIG. 37 illustrates a method 3700 in which a user opens an application on a user device, as illustrated at 3702. When the user opens the application, the system can check a map criteria, such as an initial area or region proximal to a location of the user or initial location of the requested service, as illustrated at 3704. Exemplary map criteria include a radius, estimated time to the user location, or other factors associated with providing service. For example, system can check for a radial distance from the user to determine whether a set of drivers is available. In another example, the area can be adjusted based on traffic or road patterns.

When a sufficient number of service providers are not available within the initial map criteria, the system can expand the map criteria, as illustrated at 3706. A map using the initial area or expanded area incorporating the number of services providers can be populated with the set of available service providers identified through the checking the map criteria. The map can be sent to the user device, as illustrated at 3708.

Figure 38:
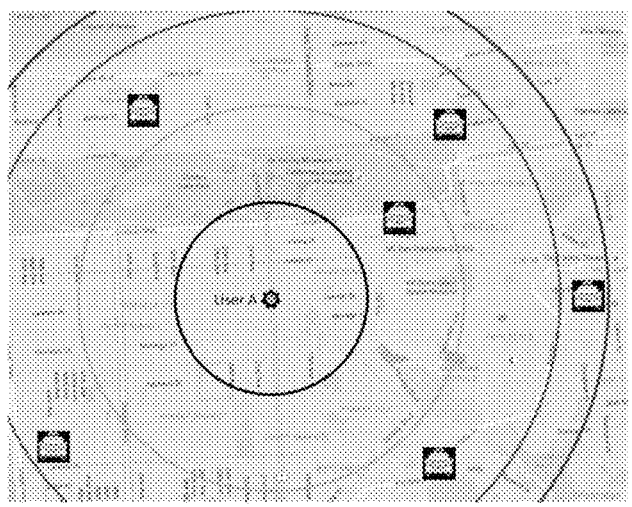
FIG. 38 includes an illustration of an exemplary scenario associated with arranging transportation.

Using such information, the user can request service, as illustrated at 3710. For example, as illustrated in FIG. 38, a user to be located at a center of a circle. The system can determine that within a first radius there are no service providers. The system can expand the criteria. When an insufficient number of service providers is found in the expanded criteria, the system can expand the criteria, such as a radius, again to identify service providers proximal to the user's location. The system can repeat the process until enough service providers are found to support the requested service.

In a further example, the system can be configured to reward efforts by service providers and groups of service providers. In particular, a service provider can be part of a group, such as a work group or a set of friends who are also service providers. The system can track individual performance in addition to group performance, providing rewards for such performance.

Figure 39:
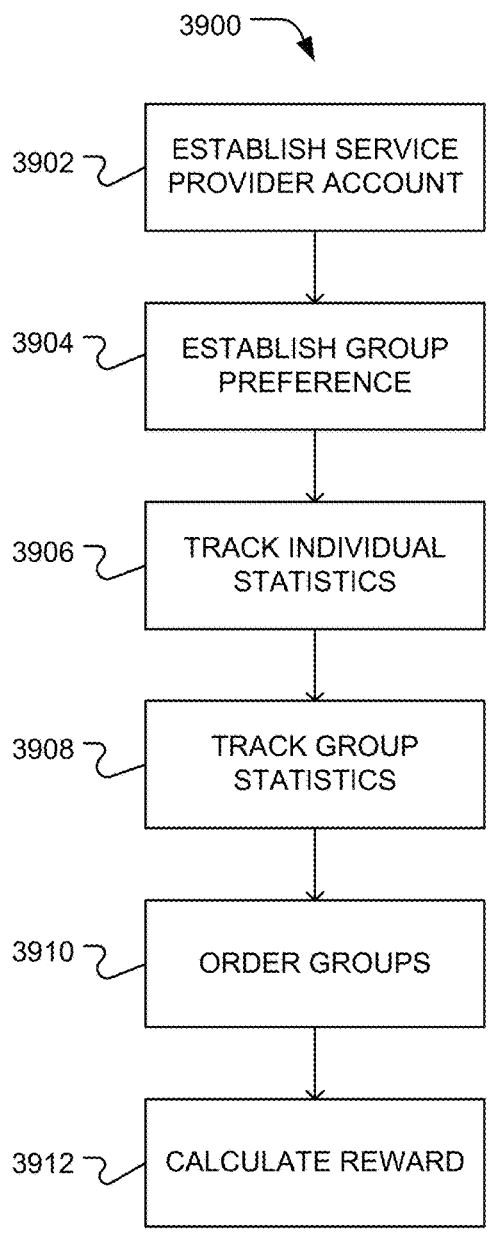
FIG. 39 includes a flow diagram illustrating an exemplary method for arranging transportation services.

In an example, in a method 3900 illustrated in FIG. 39, the system can establish a service provider account, as illustrated at 3902. The service provider account can include details such as name, driver license, vehicle features, vehicle type, vehicle registration, vehicle license plate, service provider prefer locations, such as home, and shift information. As illustrated at 3904, the system can also establish a group preference associated with the service provider. For example, a service provider can select to be a part of a group.

As a service provider provides services, the system can track individual statistics, as illustrated at 3906. Exemplary individual statistics include earnings and earnings breakdown by types of services, tips, reservations, and spontaneous services. Such statistics can be displayed to the service provider and projections of potential earnings based on the availability of the service provider can be made. Such service provider statistics can also be used to identify service requests that are beneficial to the service provider in meeting goals or reward levels.

In a further example, the system can track group statistics, as illustrated at 3908. Such group statistics can include cumulative amounts or cumulative amounts broken down by service type associated with members of the group. In particular, such statistics can be used to establish games between groups of service providers. For example, as illustrated at 3910, the groups can be ordered based on the group statistics. Such ranking of groups can be used to motivate groups to excel or earn additional money. In a particular example, groups can be ranked by a total amount of earnings, a cumulative number of rides, tips or gratuities earned, a number of reservations, or other metrics.

Based on the tracked individual statistics or tracked group statistics, various rewards or incentives can be provided, as illustrated at 3912. In an example, an individual service provider can be rewarded for their personal performance or be given a higher percentage of fares or associated fees based on their performance. In another example, a group can be rewarded with additional monetary incentives, gifts, gift cards, or other rewards having perceived value.

Figure 40:
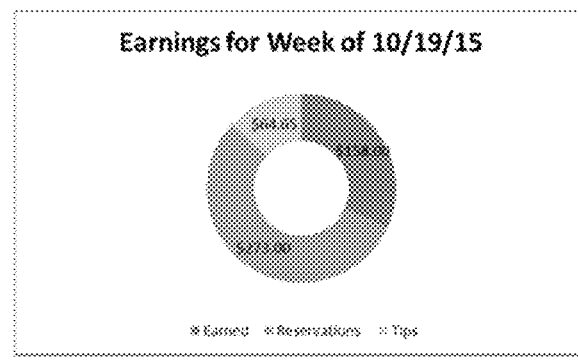
FIG. 40 includes an illustration of an exemplary representation of service provider income.

In a particular example, the statistics for either the individual service provider or a group of service providers can be presented to the service provider. For example, the statistics can be presented in a graph illustrated in FIG. 40, which illustrates revenue earned presented by category. In another example, the statistics can be presented in forms and with data consistent with reward and incentive programs.

In a first aspect, a method of accessing media includes establishing a first network connection between a service provider device and a media device, wherein establishing the first network connection includes exchanging a set of network access parameters; establishing a second network connection between a user device and the service provider device; providing to a user device the set of network access parameters of the first network connection using the service provider device; and using the user device to control the media device, the user device using the set of network access parameters to mimic the first network connection with the media device.

In an example of the first aspect, the method further includes streaming media content from the user device to the media device using the mimicked first network connection. For example, the method can further include decoding an audio file stored on the user device to stream as the media content to the media device. In another example, the method can further include accessing the media content with the user device from a streamed media source over a third network connection. For example, the third network connection comprises a cellular data network connection. In an example, the third network connection comprises a Wi-Fi network connection incompliance with the IEEE 802.11x standard.

In another example of the first aspect and the above examples, the first network connection is a wireless personal area network (WPAN) connection.

In a further example of the first aspect and the above examples, the first network connection is a wired connection. For example, the WPAN connection uses a frequency hopping spread spectrum protocol in a frequency range of 2.0 GHz and 2.6 GHz.

In an additional example of the first aspect and the above examples, the second network connection is a wireless personal area network (WPAN) connection.

In another example of the first aspect and the above examples, the set of network parameters includes a network address of the service provider device.

In a further example of the first aspect and the above examples, the set of network parameters includes an encryption key.

In an additional example of the first aspect and the above examples, the method further includes requesting service provider acknowledgment with the service provider device prior to providing the network access parameters to the user device.

In another example of the first aspect and the above examples, establishing the second network connection includes exchanging a second set of network access parameters.

In a further example of the first aspect and the above examples, the method further includes requesting a transportation service through a third network connection from a remote server, a service provider associated with the service provider device assigned to provide the transportation service. For example, the method can further include receiving at the service provider device from a remote server an identifier associated with the user device and establishing the second network connection based on the identifier. In another example, the method can further include receiving at the user device from a remote server an identifier associated with the service provider device and establishing the second network connection based on the identifier.

In an additional example of the first aspect and the above examples, the method further includes disabling the mimicked first network connection in response to a command from the service provider device via the second network connection. For example, disabling includes deleting the set of network access parameters from the user device. In another example, disabling includes disabling in response to an end of a service event.

In another example of the first aspect and the above examples, the method further includes disabling the mimicked first network connection in response to a command from a remote server via a third network connection. For example, the third network connection is between the remote server and the user device. In another example, the third network connection is between the remote server and the service provider device.

In a second aspect, a method of accessing media includes establishing a first network connection between a service provider device and a media device of a transportation vehicle, wherein establishing the first network connection includes exchanging a first set of network access parameters between the service provider device and the media device; receiving at the service provider device identification associated with a user device through a second network connection; establishing a third network connection between the service provider device and the user device using the identification associated with the user device; and receiving media content from the user device at the service provider device using the third network connection and providing with the service provider device the media content to the media device using the first network connection.

In an example of the second aspect, the first network connection is a wired connection.

In another example of the second aspect and the above examples, the first network connection is a wireless personal area network (WPAN) connection. For example, the WPAN connection uses a frequency hopping spread spectrum protocol in a frequency range of 2.0 GHz and 2.6 GHz.

In a further example of the second aspect and the above examples, the third network connection is a wireless personal area network (WPAN) connection.

In an additional example of the second aspect and the above examples, the second network connection is a cellular data network.

In another example of the second aspect and the above examples, the second network connection a Wi-Fi network connection incompliance with the IEEE 802.11x standard.

In a further example of the second aspect and the above examples, the method further includes requesting a transportation service through a fourth network connection from a remote server, a service provider associated with the service provider device assigned to provide the transportation service. For example, the method can further include receiving at the user device from a remote server an identifier associated with the service provider device and establishing the third network connection based on the identifier.

In an additional example of the second aspect and the above examples, the method further includes disabling the third network by the service provider device. For example, the service provider device disables the third network based on location. In an example, disabling the third network includes deleting network parameters associated with the third network connection. In another example, disabling includes receiving commands to disable the third network from a remote server through the second network. In a further example, disabling includes disabling in response to an end of a service event.

In another example of the second aspect and the above examples, the method further includes disabling the third network by the user device. For example, disabling includes disabling at the command of a remote server in communication with the user device through a fourth network connection. In another example, disabling includes disabling in response to an end of a service event.

In a third aspect, a method for accessing a media includes establishing a connection between a hub device and a media device; establishing a first network connection between a service provider device and the hub device; establishing a second network connection between a user device and the hub device; and directing media content to the media device through the hub device from the user device in response to permission received from the service provider device.

In an example of the third aspect, the connection between the hub device and the media device is a wired connection.

In another example of the third aspect and the above examples, the connection between the hub device and the media device is a wireless connection.

In a further example of the third aspect and the above examples, the first network connection is a wireless personal area network (WPAN) connection. For example, the WPAN connection uses a frequency hopping spread spectrum protocol in a frequency range of 2.0 GHz and 2.6 GHz.

In an additional example of the third aspect and the above examples, the second network connection is a wireless personal area network (WPAN) connection.

In another example of the third aspect and the above examples, the method further includes communicating an identifier of the hub device to the user device from a remote server through a third network connection.

In a further example of the third aspect and the above examples, the method further includes disabling the second network connection in response to a command from the remote server. For example, the third network connection is a cellular data network. In an example, the third network connection a Wi-Fi network connection incompliance with the IEEE 802.11x standard.

In an additional example of the third aspect and the above examples, the method further includes disabling the second network connection in response to a command from the service provider device.

In another example of the third aspect and the above examples, the media content is stored and decoded on the user device.

In a further example of the third aspect and the above examples, the media content is accessed from a remote server by the user device through a third network connection.

In a fourth aspect, a method for providing a transportation service includes receiving at a server a service request from a user device, the service request including an initial location and a final location; determining a proposed fare at the server based on the initial location and the final location; providing the service request and the proposed fare to a plurality of service provider devices, each service provider device associated with a service provider; from one or more service provider devices of the plurality of service provider devices, receiving offered fares; providing to the user device a set of service offerings, each service offering of the set of service offerings including an offered fare of the offered fares received from the one or more service provider devices and service provider information of the service provider associated with the service provider device associated with the offered fare; receiving a selected service offering of the set of service offerings from the user device; and using the server, initiating transportation service between a user associated with the user device and the service provider associated with a select service provider device associated with the selected service offering.

In an example of the fourth aspect, an offered fare of the offered fares is different from the proposed fare.

In another example of the fourth aspect and the above examples, the offered fares are derived from a selection of a fare from a list of fares.

In a further example of the fourth aspect and the above examples, the service provider information includes vehicle information associated with the service provider.

In an additional example of the fourth aspect and the above examples, the service provider information includes a service provider rating, a number of miles driven, a number of trips provided, driver name, phone number, license plate, or vehicle information, or a combination thereof.

In another example of the fourth aspect and the above examples, the service provider information includes an identifier of the service provider device.

In a further example of the fourth aspect and the above examples, initiating the transportation service includes providing routing information to the initial location to the select service provider device.

In an additional example of the fourth aspect and the above examples, initiating the transportation service includes providing selected service vehicle information to the user device when the service provider is in route.

In another example of the fourth aspect and the above examples, providing the service request includes providing a user rating, a number of trips, a number of miles used, or a combination thereof to the service provider devices.

In a fifth aspect, a method of establishing a transportation service includes receiving from user device a service request, the service request including an initial location and a final location; determining a set of available drivers based on proximity to the initial location; determining a driver benefit score for each of the set of available drivers; and providing to service provider devices associated with the set of available drivers, the service request and a recommendation based on the driver benefit score of a driver associated a service provider device of the service provider devices.

In an example of the fifth aspect, the driver benefit score is determined based on the final location and a proximity to a driver preferred location.

In another example of the fifth aspect and the above examples, the service request includes an initial time and wherein the driver benefit score is determined based on the final location and an estimated final time.

In a further example of the fifth aspect and the above examples, the driver benefit score is determined based on an estimated fare.

In an additional example of the fifth aspect and the above examples, the driver benefit score is determined based on scheduled reservations associated with the driver.

In a sixth aspect, a method of arranging a transportation service includes establishing a subscription account for a user associated with a user device, the subscription account including a mileage equivalent count; receiving a service request from the user device, the service request including an initial location and a final location; determining an estimated distance based on the initial location and the final location; and comparing the distance to the mileage equivalent count.

In an example of the sixth aspect, the method further includes determining an estimated time based on the initial location and final location, and determining a mileage equivalent to compare to the mileage equivalent count.

In another example of the sixth aspect and the above examples, the method further includes determining a total time to complete the service request, augmenting a mileage equivalent based on the total time and deducting the mileage equivalent from the mileage equivalent count.

In a further example of the sixth aspect and the above examples, the method further includes receiving a monetary value associated with the transaction, converting the monetary value to a mileage equivalent, and deducting the mileage equivalent from the mileage equivalent count. For example, the monetary value is associated with a tip.

In a seventh aspect, a method for arranging a transportation service includes determining a reservation associated with a service provider device, the reservation including a reservation start time and a reservation initial location; receiving a service request having an associated service initial location and a service final location; determining a travel time associated with the service provider device, the travel time including a service travel time associated with completing the service request and an intermediate travel time associated with traveling to the reservation initial location from the service final location; comparing the travel time with a time to the reservation start time; and blocking the service request from the service provider device based on the comparing.

In an eighth aspect, a method for arranging a transportation service includes initiating a calendar entry in an event entry form of a calendar system; displaying on the event entry form a transportation access control associated with a transportation service; in response to selection of the transportation access control, displaying a transportation reservation form; and scheduling a transportation reservation based on information drawn from the transportation reservation entry form and the event entry form.

In a ninth aspect, a method for arranging a transportation service includes receiving a transportation request from a user device, the transportation request including a start location and destination; determining an advertiser having an advertiser location associated with the initial location, route, or destination; and transmitting an advertising message associated with the advertiser to the user device.

In a tenth aspect, a method for arranging a transportation service includes accessing a user account entertainment preference associated with a user, the user account referencing a user device; searching an event list for an entertainment event corresponding to the user account entertainment preference; and providing to the user device an offer message including an offer price for tickets and transportation to the entertainment event.

In an eleventh aspect, a method for arranging a transportation service includes receiving from a service provider device a service provider request to approach a preferred location, the service provider at a first location; accessing a service provider record indication the preferred location; selecting a transportation request from a set of transportation request ending at a second location closer the preferred location than the first location; and providing the transportation request to the service provider device.

In a twelfth aspect, a method for arranging a transportation service includes determining an end location of a scheduled reservation associated with a service provider; estimating an end time associated with completing the scheduled reservation; accessing a set of reservations, each reservation including a start location and a start time; determining a select reservation compatible with the end time and end location associated with the scheduled reservation; and providing to a service provider device associated with the service provider a transportation request associated with the select reservation.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method to facilitate a transportation service, the method comprising:
   receiving at a transportation server, from a service provider application implemented on a service provider device, activation of a location bound feature, the location bound feature associated with a destination;
   receiving at the transportation server a service request via a user application implemented on a user device, the service request including an initial location and a final location;
   comparing using the transportation server the final location of the service request with the destination associated with the location bound feature; and
   providing from the transportation server to the service provider application implemented on the service provider device the service request based at least in part on the comparing, wherein the providing the service request to the service provider application includes providing a recommendation based at least in part on the comparing, the service request having a display style selected from normal or recommended based on the recommendation.

2. The method of claim 1, wherein the location bound feature is further associated with an end time, the method further comprising:
   estimating with the transportation server an arrival time associated with the service request; and
   comparing with the transportation server the arrival time and the end time;
   wherein the recommendation is based at least in part on the comparing the arrival time and the end time.

3. The method of claim 1, further comprising receiving and storing the destination at the transportation server.

4. The method of claim 1, further comprising receiving at the transportation server acceptance of the service request from the service provider application implemented on the service provider device and associating a service provider to the service request.

5. The method of claim 4, further comprising providing from the transportation server a notification to the user application implemented on the user device, the notification including an identity of the service provider associated with the service request.

6. The method of claim 1, further comprising determining with the transportation server a fare associated with the service request and providing the fare to the user application implemented on the user device.

7. The method of claim 6, further comprising providing from the transportation server the fare to the service provider application implemented on the service provider device.

8. The method of claim 1, wherein comparing the destination and the final location includes determining whether the final location is closer to the destination than a current location of the service provider device.

9. The method of claim 1, wherein comparing the destination and the final location includes determining whether the final location is at a distance less than a radius from the destination.

10. The method of claim 1, further comprising:
    receiving at the transportation server from a second user device a second service request via a second user application implemented on the second user device, the second service request including a second initial location and a second final location;
    comparing using the transportation server the second final location of the second service request with the destination associated with the location bound feature; and
    providing from the transportation server to the service provider application implemented on the service provider device the second service request without the recommendation based at least in part on the comparing the second final location to the destination, the second service request having a display style selected from normal or recommended based on the comparing.

11. The method of claim 1, wherein the user device is a mobile device.

12. The method of claim 1, wherein the service provider device is a mobile device.

13. A method to facilitate a transportation service, the method comprising:
    receiving, at a transportation server from a service provider application implemented on the service provider mobile device, activation of a location bound feature, the location bound feature associated with a destination, the service provider mobile device associated with a service provider;
    receiving at the transportation server a service request via a user application implemented on a user mobile device, the service request including an initial location and a final location;
    determining using the transportation server a fare based on the service request;
    comparing using the transportation server the final location of the service request with the destination associated with the location bound feature; and
    providing from the transportation server to the service provider application implemented on the service provider mobile device the service request and the fare based at least in part on the comparing, wherein the providing the service request to the service provider application includes providing a recommendation based on the comparing, the service request having a display style selected from normal or recommended based on the recommendation.

14. The method of claim 13, wherein the location bound feature is further associated with an end time, the method further comprising:
estimating using the transportation server an arrival time associated with the service request; and
comparing using the transportation server the arrival time and the end time;
wherein the recommendation is based at least in part on the comparing the arrival time and the end time.

15. The method of claim 13, further comprising receiving the destination at the transportation server from the service provider application implemented on the service provider mobile device and storing the destination.

16. The method of claim 13, further comprising receiving at the transportation server acceptance of the service request from the service provider application implemented on the service provider mobile device.

17. The method of claim 16, further comprising providing from the transportation server a notification to the user application implemented on the user mobile device, the notification including an identity of the service provider associated with the service request and the fare.

18. The method of claim 13, wherein comparing the destination and the final location includes determining whether the final location is closer to the destination than a current location of the service provider mobile device.

19. The method of claim 1, further comprising:
determining using the transportation server a benefit score, the benefit score incorporating results of the comparing; and
providing using the transportation server the service request to the service provider application in response to the benefit score.

20. The method of claim 1, further comprising:
determining using the transportation server a benefit score, the benefit score incorporating results of the comparing; and
providing the service request from the transportation server to the service provider application in response to the benefit score.

* * * * *